(12) United States Patent
Chattopadhyay et al.

(10) Patent No.: US 11,887,377 B2
(45) Date of Patent: *Jan. 30, 2024

(54) ACCELERATION OF DATA PROCESSING FOR OBJECT DETECTION

(71) Applicant: Mobileye Vision Technologies Ltd., Jerusalem (IL)

(72) Inventors: Rita Chattopadhyay, Chandler, AZ (US); Monica Lucia Martinez-Canales, Los Altos, CA (US); Tomasz J. Wolak, Howell, NJ (US)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/957,161

(22) Filed: Sep. 30, 2022

(65) Prior Publication Data

US 2023/0081849 A1    Mar. 16, 2023

Related U.S. Application Data

(63) Continuation of application No. 16/367,740, filed on Mar. 28, 2019, now Pat. No. 11,482,011.

(51) Int. Cl.
*G06V 20/58* (2022.01)
*G01S 17/931* (2020.01)
*G06V 10/25* (2022.01)
*G06V 10/764* (2022.01)
*G01S 17/89* (2020.01)

(52) U.S. Cl.
CPC ............ *G06V 20/58* (2022.01); *G01S 17/931* (2020.01); *G06V 10/25* (2022.01); *G06V 10/764* (2022.01); *G01S 17/89* (2013.01)

(58) Field of Classification Search
CPC ....... G01S 17/931; G01S 17/89; G06V 20/58; G06V 10/25; G06V 10/764
USPC .......................................................... 702/150
See application file for complete search history.

(56) References Cited

U.S. PATENT DOCUMENTS

| 10,510,154 | B2 | 12/2019 | Chattopadhyay et al. |
| 10,803,326 | B2 | 10/2020 | Zou et al. |
| 10,816,992 | B2 | 10/2020 | Chen |
| 11,482,011 | B2* | 10/2022 | Chattopadhyay .... G06V 10/764 |
| 2019/0051006 | A1* | 2/2019 | Chattopadhyay ....... G06T 7/143 |

* cited by examiner

*Primary Examiner* — Aditya S Bhat
(74) *Attorney, Agent, or Firm* — FINNEGAN, HENDERSON, FARABOW, GARRETT & DUNNER LLP

(57) ABSTRACT

Spatial data may be divided along an axis of the second dimension into a first data segment and a second data segment, such that the first data segment is limited to data points of the spatial data with second dimension coordinates within a first range and the second data segment is limited to data points of the spatial data with second dimension coordinates within a second range. A first processing element may execute an object detection process on the first data segment to generate a first list of objects within the first data segment. A second processing element may execute the object detection process on the second data segment to generate a second list of objects within the second data segment. A first set of objects detected in the first data segment may be combined with a second set of objects detected in the second data segment.

20 Claims, 16 Drawing Sheets

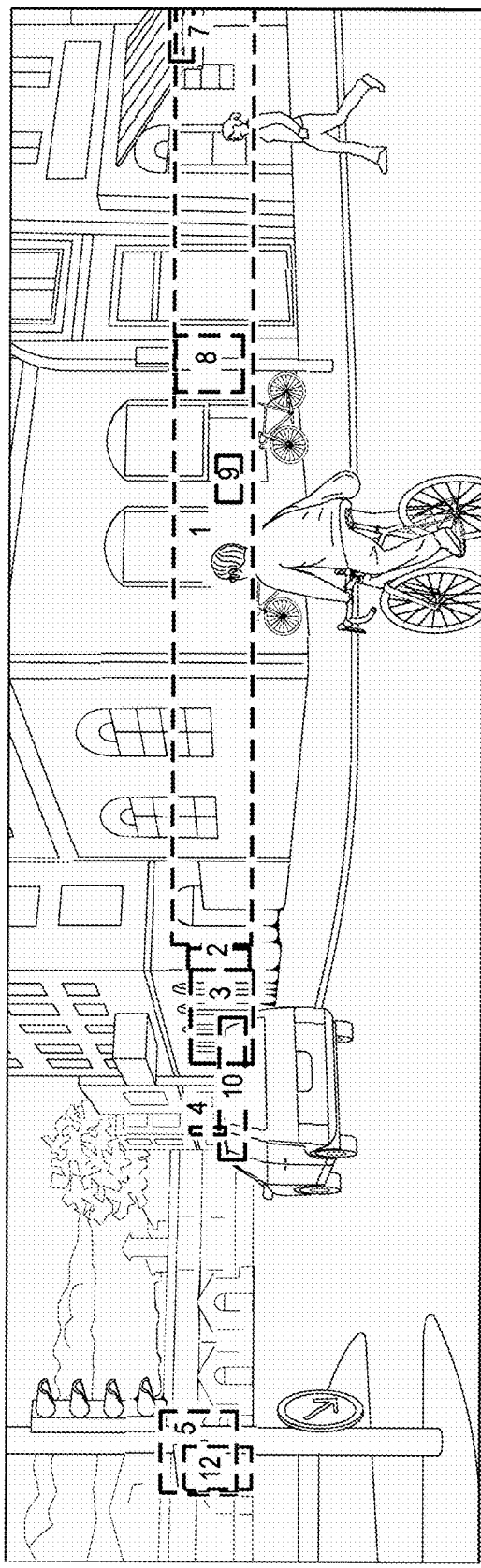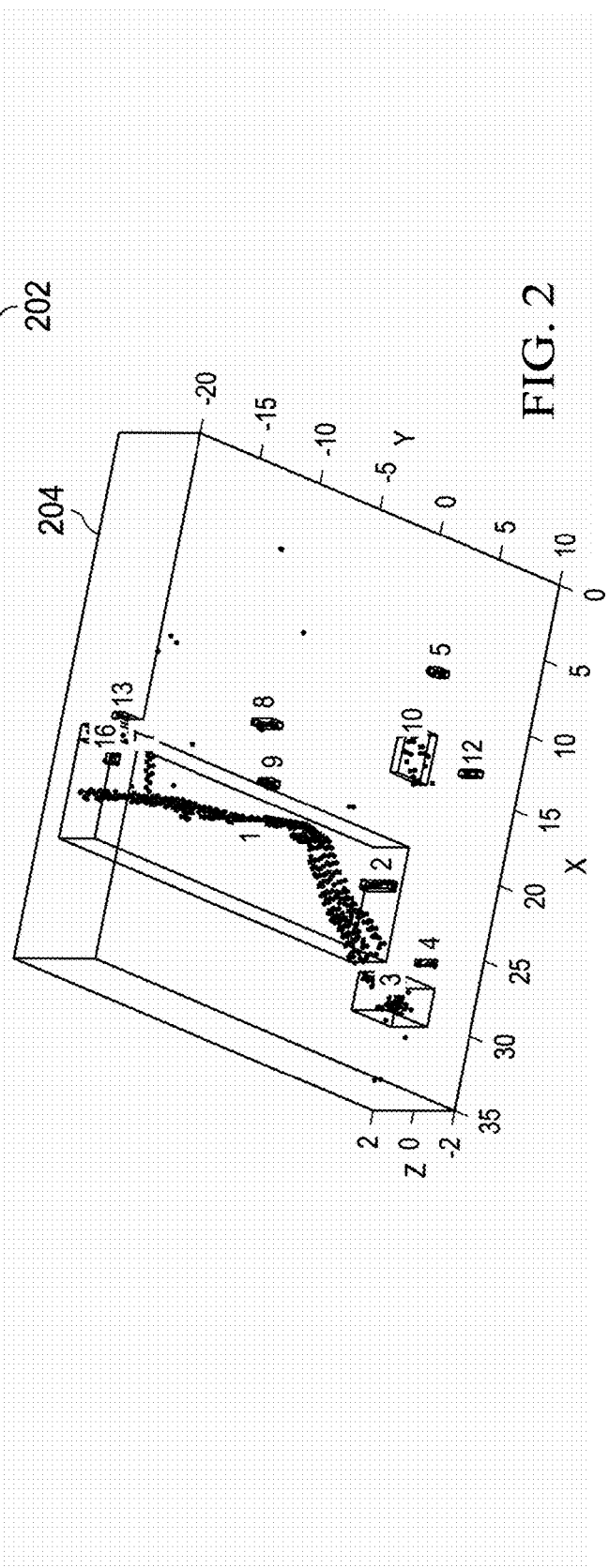
FIG. 2

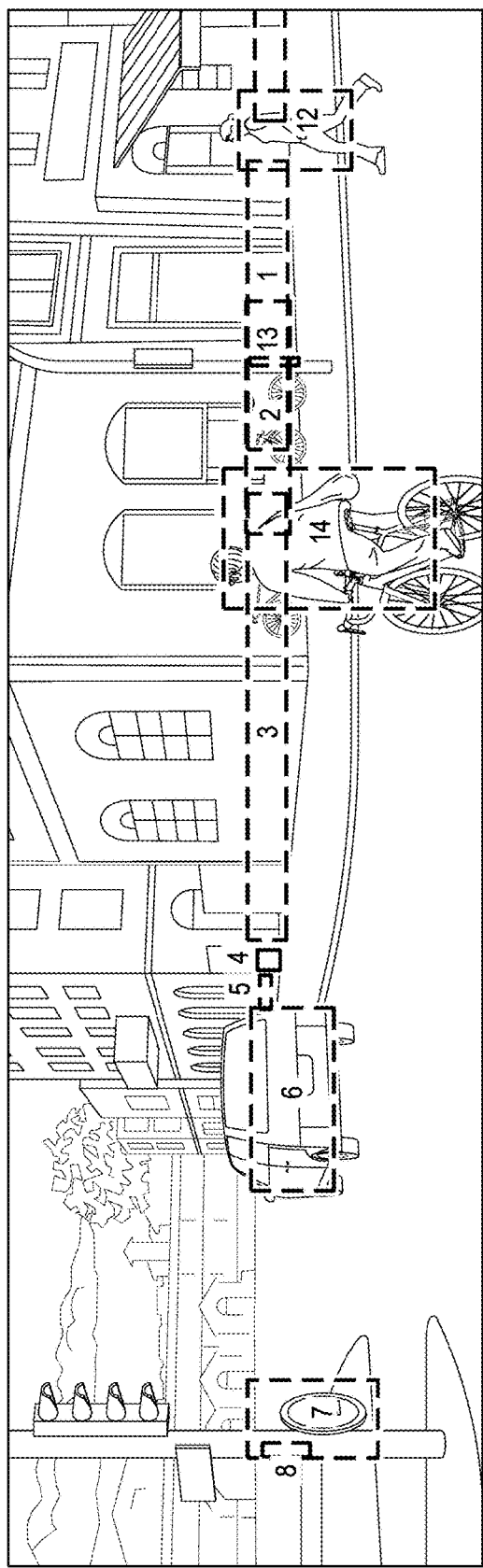
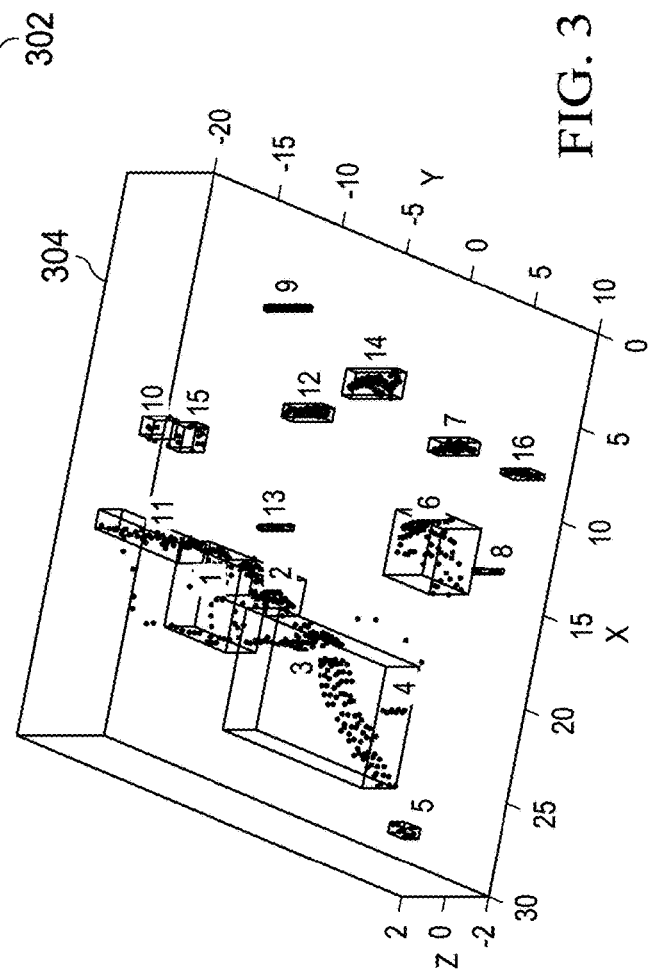
FIG. 3

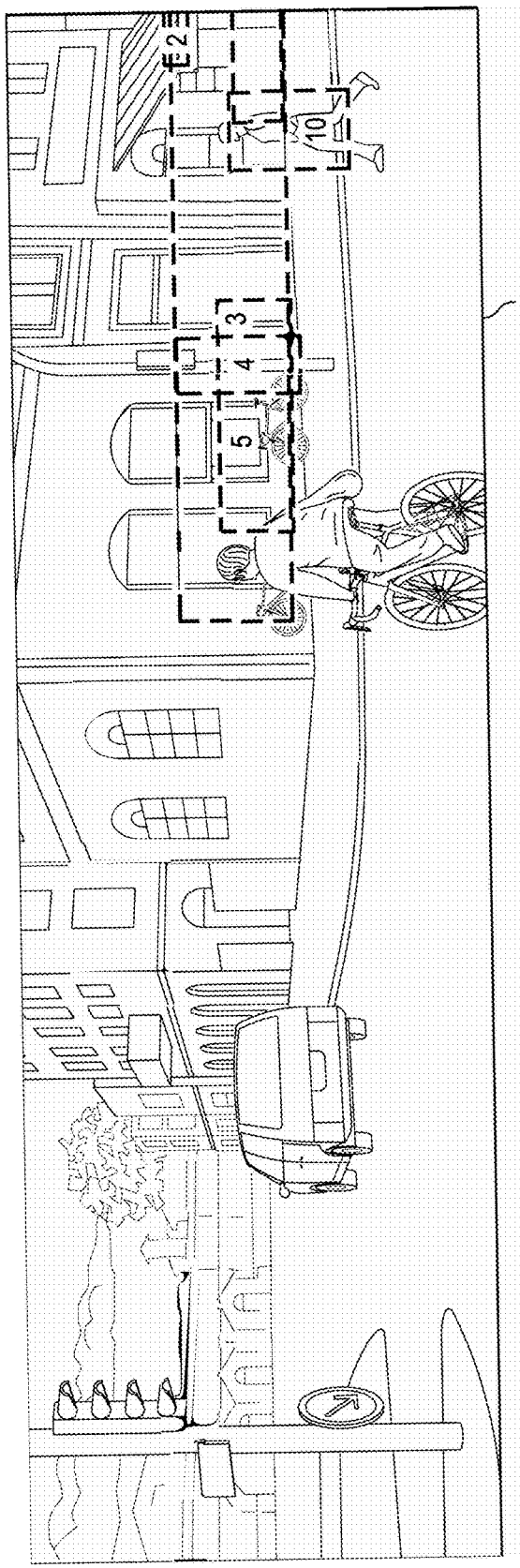
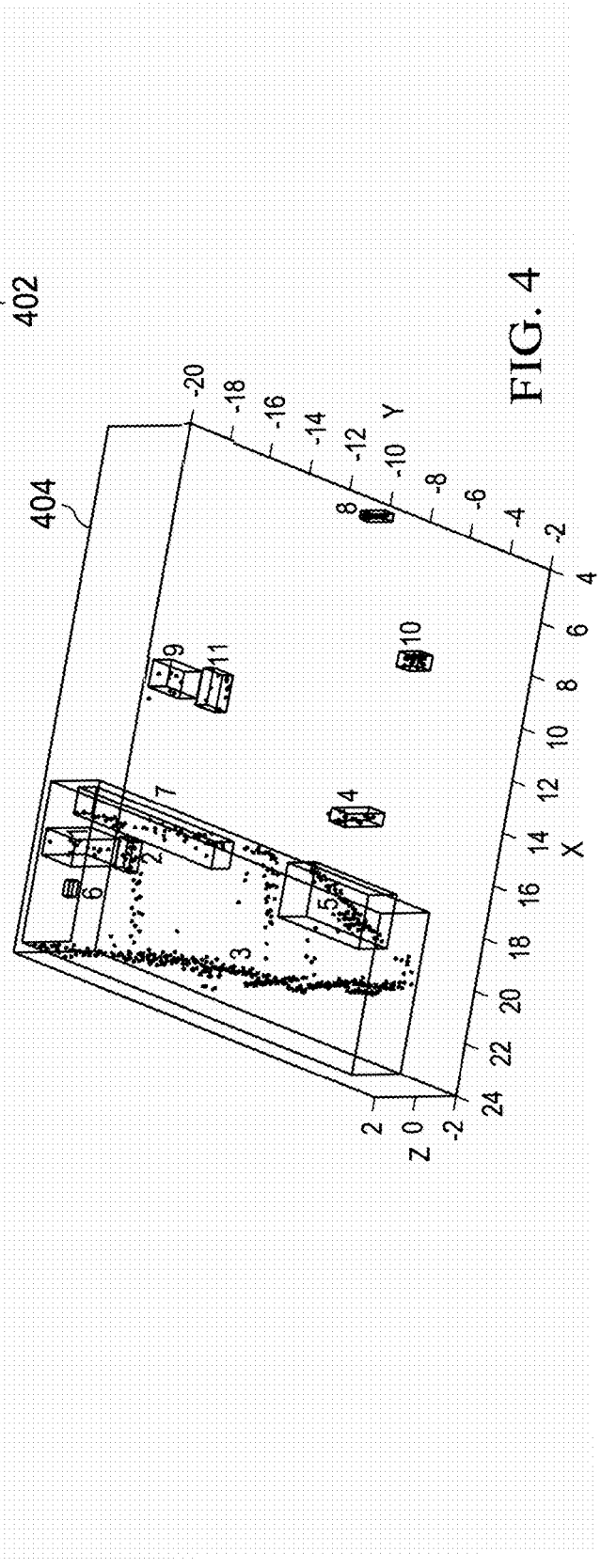
FIG. 4

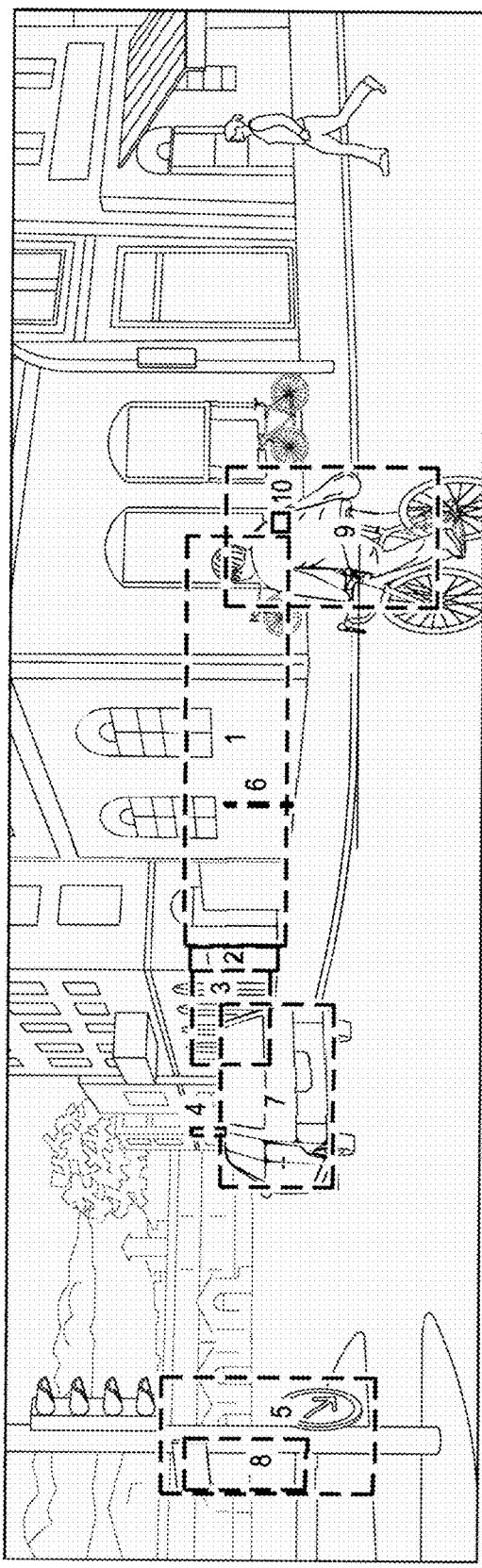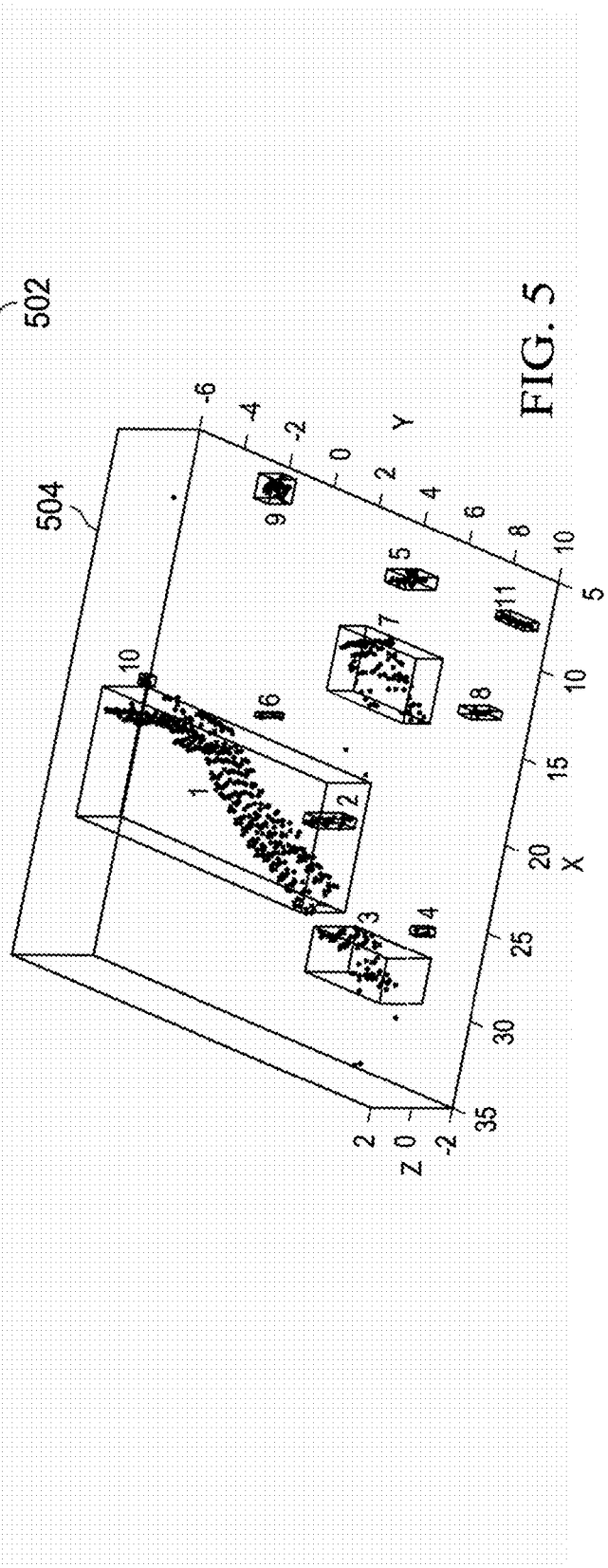
FIG. 5

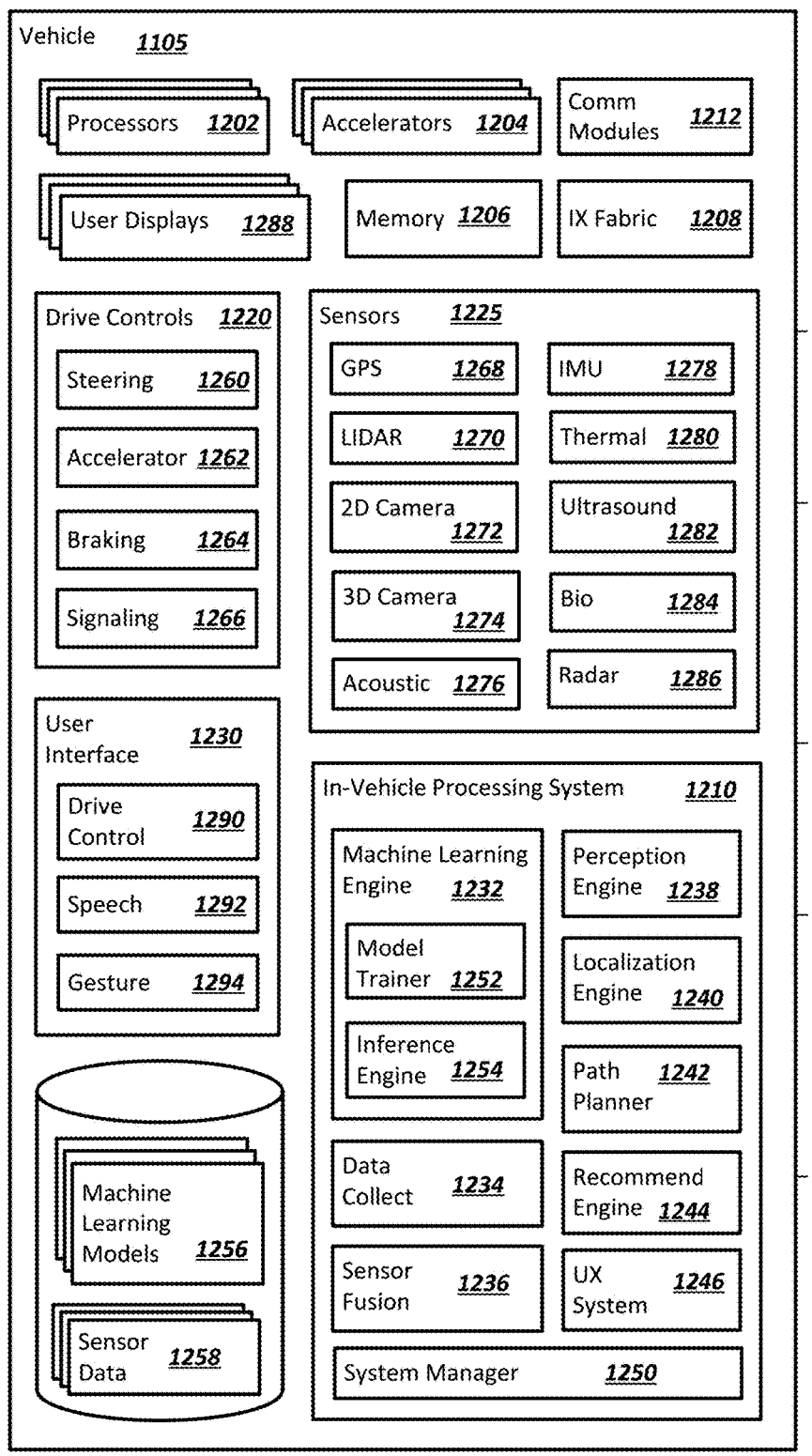
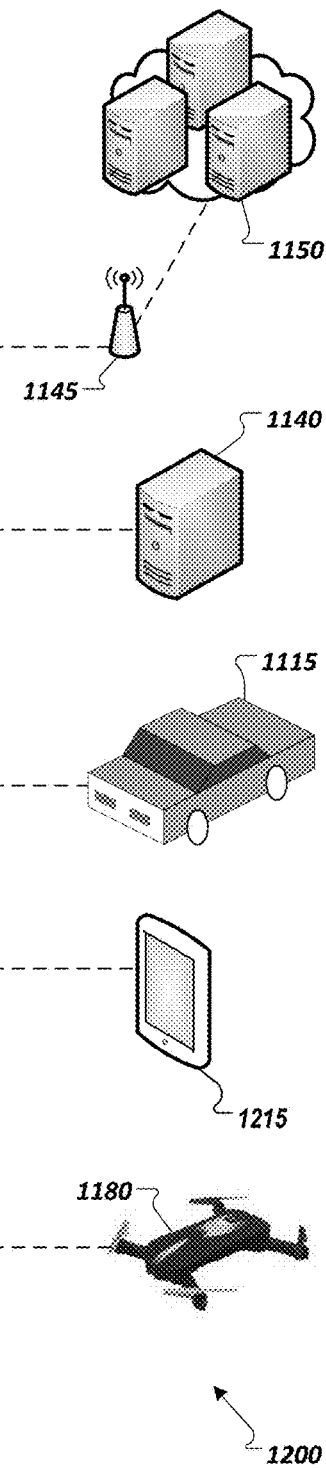
FIG. 12

(12) United States Patent
US 11,887,377 B2

ACCELERATION OF DATA PROCESSING FOR OBJECT DETECTION

CROSS-REFERENCE TO RELATED APPLICATION

This application is a continuation of (and claims the benefit of priority under 35 U.S.C. § 120) U.S. application Ser. No. 16/367,740, filed Mar. 28, 2019, and entitled ACCELERATION OF DATA PROCESSING FOR OBJECT DETECTION. The disclosure of the prior application is considered part of and hereby incorporated by reference in its entirety in the disclosure of this application.

TECHNICAL FIELD

This disclosure relates in general to the field of computing systems and, more particularly, to computing systems facilitating object detection.

BACKGROUND

Some vehicles are configured to operate in an autonomous mode in which the vehicle navigates through an environment with little or no input from a driver. Such a vehicle typically includes one or more sensors that are configured to sense information about the environment. For example, the sensed information may be processed to detect one or more objects, such as other vehicles, pedestrians, bicycles, trees, buildings, bridges and other infrastructure, as well as obstacles such as bumps and potholes, construction barriers, debris, animals, and the like. The vehicle may use the detected objects to navigate through the environment. For example, if the sensors sense that the vehicle is approaching an obstacle, the vehicle may navigate around the obstacle.

BRIEF DESCRIPTION OF THE DRAWINGS

FIGS. 2-5 depict instances of a scene annotated with detected objects and graphs of objects detected within the scene in accordance with certain embodiments.

FIG. 12 is a simplified block diagram illustrating an example implementation of a vehicle (and corresponding in-vehicle computing system) equipped with autonomous driving functionality in accordance with certain embodiments.

Like reference numbers and designations in the various drawings indicate like elements.

DESCRIPTION OF EXAMPLE EMBODIMENTS

Figure 1:
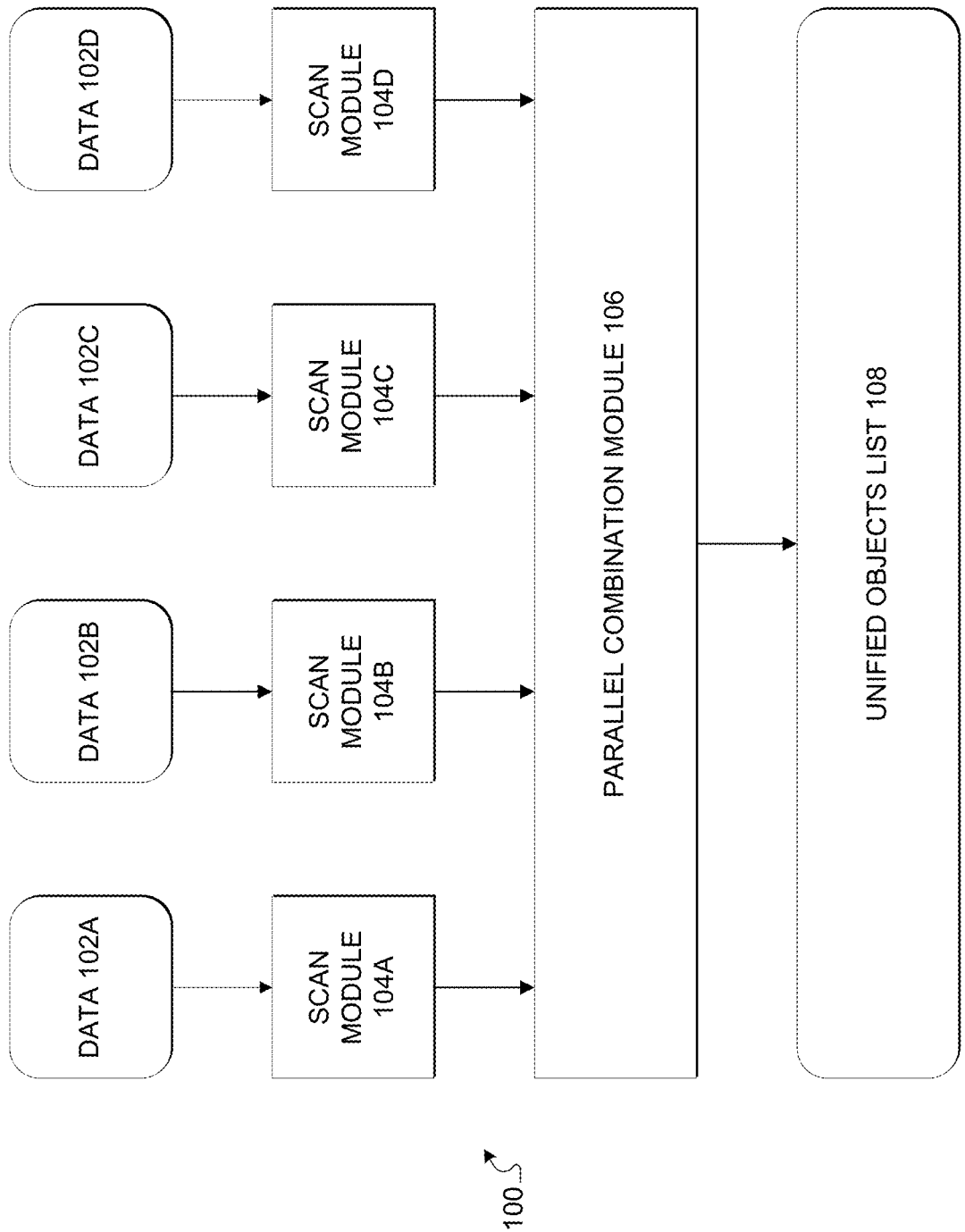
FIG. 1 depicts a system 100 for accelerating data processing for object detection in accordance with certain embodiments.

Object detection plays a vital role in safe navigation during autonomous driving. High-accuracy detection as well as low-latency detection are desirable for autonomous driving in order to leave sufficient allowance for the controller software/hardware and vehicle control system to take action based on the detected objects, for example, by applying brakes or changing a vehicle's path to avoid collision.

Object detection may be performed based upon data (e.g., spatial data) acquired by one or more sensors. Light detection and ranging (LiDAR) is one type of sensor that may collect 3D spatial data. LiDAR works by measuring a distance to an object by illuminating that object with a pulsed laser light and measuring reflected pulses with a sensor. Differences in laser return times and wavelengths are used to make a digital 3D-representation of the object, e.g., including the object's distance from the point of measurement, its outline, and surface contour. In some systems, the features of the digital 3D representation may be used to recognize measured objects from among a library of known objects.

Various examples described below contemplate the use of a LiDAR system. However, embodiments contemplated herein may include any device or combination of devices to capture 3D or other spatial data, such as a camera with 3D scanning capability utilizing laser ranging, stereoscopic vision, ultrasound, radio detection and ranging (RADAR), or other suitable technology or combination of technologies. In general, the output from a 3D capture device, whether LiDAR or another type, includes ranging, or distance, indicia. For instance, the output may include a point cloud of measured distances within the field of view of the 3D capture device. In various embodiments, when scanned by a 3D capture device, a field of view may be represented as a point cloud having points positioned at the respective surfaces of the various objects. The location of each point may be represented in a Cartesian, cylindrical, spherical, other suitable three-dimensional coordinate system, or other suitable coordinate system. For example, each point may be represented as (x,y,z) [e.g., 3D cartesian], (w,x,y,z) [e.g., Quaternion], or (u,v,w,x,y,z) [e.g., Plucker coordinates], (a,b) [e.g., Dual Quaternion], or [w_a, x_a_y_a, z_a, w_b, x_b, y_b, z_b] [another form of Dual Quaternion]. Any of these coordinate systems may be used in a 3D+ space coordinate system where the + represents additional information from, e.g., the reflected light wave.

In various embodiments, LiDAR sensors are deployed for acquiring high density 3D spatial data of a scene for object detection, as such sensors perform robustly with respect to daylight changes and occlusion. Many LiDAR-based applications (e.g., autonomous ground and air vehicles) require real time processing capabilities for navigation. The processing of the LiDAR data is time consuming due to the volume of the data and the complex and iterative nature of the processing algorithms.

Most of the object detection algorithms available in standard machine learning libraries are highly serial in nature. In order to reduce execution time, these algorithms may be implemented on processors such as multicore central processing units (CPUs), graphics processing units (GPUs) or field programmable gate arrays (FPGAs) using compiler intrinsic functions and other hardware optimization methods. However, the basic algorithms retain their serial nature.

Redesign of the basic object detection algorithms to incorporate parallelization on multiple processing elements is difficult, as such requires a thorough knowledge of the algorithm details which can be quite complex. Moreover, parallel implementation of standard machine learning algorithms for object detection are not publicly available. However, parallelization of these algorithms, combined with hardware level optimizations, have the potential to greatly reduce the execution time and efficiency of applications utilizing these algorithms.

Various embodiments of the present disclosure provide acceleration of real-time processing of 3D spatial data through a highly time efficient parallel architecture of an object detection algorithm (e.g., process) for autonomous vehicles such as cars, drones, and robots. Some embodiments provide novel approaches for parallelizing the 3D spatial data into segments for parallel processing. Such embodiments may be designed to interact favorably with the way LiDAR returns are recorded as the beam scans the azimuth and elevation angles. Furthermore, because of the adaptive nature of object detection algorithms that may be used, parallelization methods described herein may further increase the accuracy and resolution of object detection.

FIG. 1 depicts a system 100 for accelerating data processing for object detection. In a first stage, 3D spatial data (e.g., LiDAR point cloud data) is divided into parallel data segments (e.g., data 102A, data 102B, data 102C, and data 102D) for processing by scan modules (104A-104D), which may be implemented by parallel processing elements of a processor, e.g., one or more multi-core CPUs, FPGAs, or GPUs.

In some embodiments, the 3D spatial data (e.g., LiDAR point cloud data) may be derived from raw data scanned by one or more sensors (e.g., LiDAR sensors). The 3D spatial data may be represented in any suitable format. In a first example, the 3D spatial data comprises a collection of data points, where each data point includes a 3D coordinate set (e.g., an X coordinate, a Y coordinate, and a Z coordinate) representing a position as well as an intensity value (e.g., an amount of light returned from that coordinate) measured for that position. In some embodiments, the 3D spatial data may include alternative or additional information. In various embodiments described herein (e.g., with reference to a land vehicle), the X dimension extends in front of the vehicle in the direction the vehicle is facing (e.g., the X coordinates increase with increasing distance in front of the vehicle), the Y dimension extends to either side of the vehicle (e.g., positive Y coordinates correspond to positions to the left of the vehicle and negative Y coordinates correspond to positions to the right of the vehicle), and the Z dimension extends in the vertical direction (e.g., the Z coordinate increases with increasing elevation).

In the embodiment depicted, a collection of 3D spatial data (e.g., a set of data points collected for a particular instance of time) is divided into parallel 3D data segments 102A, 102B, 102C, and 102D. In various embodiments, the collection of 3D spatial data for a field of view may be divided into any number of data segments, such as less segments (e.g., two or three segments) or more than four segments.

In various embodiments, the 3D spatial data is divided into parallel 3D data segments using Y-axis based division. In Y-axis based division, the data segments are divided along the Y-axis, such that each data segment is limited to data points of the 3D spatial data that have a Y coordinate within a particular range of Y coordinate values. For example, a first data segment may include all data points having Y coordinate values of 0 or greater (e.g., the left half of a scene) and a second data segment may include all data points having Y coordinate values of 0 or less (e.g., the right half of a scene). In some embodiments, each data segment may include all data points of the 3D spatial data collection that have a Y coordinate within the range for the data segment (and thus the X and Z coordinates of the data points within each segment may span the range of available values).

In various embodiments, the adjacent data segments may overlap slightly, e.g., over a range that is a very small fraction of the Y coordinate ranges of either data segment (e.g., less than $\frac{1}{100}$). In the example above where a first data segment includes all data points having Y coordinate values of 0 or greater and a second data segment includes all data points having Y coordinate values of 0 or less, the ranges for the first and second data segments overlap at Y=0. Thus, the data points that have Y coordinates of 0 may belong to both the first data segment and the second data segment. The data points that belong to both segments may be referred to herein as an overlapping data segment. In this example, the overlapping segment has a width of one coordinate unit (e.g., pixel, voxel, etc.) because it only includes coordinates with one particular Y coordinate value (i.e., 0). In other embodiments, the width of the overlapping segment may be two coordinate units (e.g., covering two adjacent Y coordinate values), three coordinate units, or other suitable number of coordinate units.

Utilizing Y-axis based division results in efficient combination of 3D spatial data (e.g., point clouds) across parallel data segments 102, decreasing the processing time due, at least in part, to a reduction in the number of objects that overlap between data segments (objects that appear in two segments result in combinatorial processing, e.g., to determine the boundaries of the combined object) relative to the number of objects that overlap when the data is divided equally as will be explained in more connection with FIGS. 2 and 3. This result is a byproduct of the way the LiDAR returns are recorded in a data array as the beam sweeps in azimuth and elevation.

Each of the data segments 102 is provided to a scan module 104. For example, data segment 102A is provided to scan module 104A, data segment 102B is provided to scan module 104B, and so on. Each scan module 104 may include a processing element comprising circuitry to perform a 3D object detection algorithm. For example, a scan module may be a core of a processor, a block of circuitry on an FPGA, GPU, or other processor, or other suitable circuitry to perform an object detection algorithm.

An object detection algorithm (e.g., process) may identify clusters in the 3D spatial data (e.g., point cloud data) corresponding to different objects in the field of view of the 3D capture device. For example, the object detection algorithm may search for data points with relatively high intensities in proximity with each other within a data segment 102 to identify objects represented by the data points of the data segments. In various embodiments, the object detection module may utilize any one or more of a cluster algorithm, a classification algorithm, or a machine learning algorithm. For example, the object detection algorithm may utilize one or more of the following models or other suitable models: K-Means, K-Nearest Neighbors (KNN) Classifier, Support Vector Machine Classifier, Neural Network, Hidden Markov Model, Adaboost Classifier, Edge Detection for Images, or Connected Components.

In some embodiments, parameters of an object detection algorithm performed by one or more scan modules may be dynamically adjusted in response to a point-cloud density function. Some embodiments adjust the object detection algorithm parameters per candidate object based primarily on the measured range to each candidate object. Accordingly, for a given field of view, the various objects therein may be processed with differing object detection algorithm parameter values. In an embodiment, candidate objects at the same or similar range are processed with the same object detection parameter values. Similarity of range may be defined based on certain similarity criteria, such as falling within a common band of ranges, for instance. In a particular embodiment, the parameters of the object detection algorithm are further adjusted in response to a prevailing environmental condition that variously affects the point cloud distribution at different distances.

Examples of parameters that may be varied for different object detection models are as follows:

| | |
|---|---|
| K-Means | Number of clusters |
| DBSCAN | Number of points in a cluster (k) |
| | Distance between points in a cluster or size of neighborhood ($E_{ps}$) |
| KNN Classifier | Number of points sorted in order of distance, to be considered as neighbors of a point. |
| Support Vector Machine Classifier | Kernel type, Kernel parameters, Regularization parameters (C, epsilon) |
| Neural Network | Number of hidden layers |
| | Learning rate |
| | Number of learning iterations |
| | Initial learning weights |
| | Type of normalization for normalizing features |
| Hidden Markov Model | Window length for learning a sequence |
| Adaboost Classifier | Number of iterations |
| Edge Detection for Images | Type of mask (e.g., Sobel, Canny, etc.) |
| Connected Components | Distance between components for considering as connected |
| | Number of passes |

In various embodiments, the scan modules (or at least a plurality thereof) may each process a distinct data segment 102 in parallel by performing an object detection algorithm on their respective data segment 102. In some embodiments, the same object detection algorithm is executed by each scan module 104. In other embodiments, different object detection algorithms may be used by different scan modules. For example, one or more of the object detection algorithms may be optimized for the particular scan module 104 executing the algorithm, e.g., based on the particular portion of the field of view represented by the corresponding data segment.

Each scan module 104 may output information associated with detected objects in the data segment 102 processed by the scan module 104. For example, the output of a scan module 104 may represent location and contours of a detected object. In one embodiment, the contours may be represented by boundary information, such as coordinates of 3D boundary boxes.

The outputs of the scan modules 104 are provided to the parallel combination module 106. The parallel combination module 106 combines objects detected from each of the parallel segments 102 using efficient logic to resolve objects that overlap across segments and generates a unified list of objects present in the 3D spatial data (e.g., LiDAR point cloud data), e.g., unified objects list 108. In various embodiments, the unified list of objects may include information indicating the location and contours of each detected object. Various architectures for the parallel combination module 106 will be described in more detail in connection with FIGS. 5 and 6. In various embodiments, parallel combination module 106 may include a plurality of processing elements that operate in parallel, wherein each processing element combines objects from two neighboring data segments 102.

FIG. 2 depicts a scene (e.g., a field of view of an image sensor) 202 annotated with detected objects and a graph 204 of objects detected within the scene 202. FIG. 3 depicts a scene 302 annotated with detected objects and a graph 304 of objects detected within the scene 302. The graphs 204 and 304 depict boundaries of objects detected in the associated data segments. The graphs include an X, Y, Z coordinate space in which the vehicle position is (0, 0, 0).

The depicted scenes 202 and 302 are identical, but in this example the 3D spatial data has been split into two equal halves by volume of the data, independent of the actual coordinates of the data. For example, the first half of data received during a LiDAR sweep may be placed into the first data segment (with the detected objects of the first data segment annotated on scene 202 and shown in graph 204) and the second half of the data received during the LiDAR sweep may be placed into the second data segment (with the detected objects of the second data segment annotated on scene 302 and shown in graph 304). Because the field of view of a 3D sensor (e.g., a LiDAR) may be wider than the image sensor that captured scene 202, some of the objects around the periphery may appear in graphs 204 and 304, but not in scenes 202 and 302. An example range of coordinates for data split into equal halves by volume is shown in the following table (this table does not necessarily correspond to the scene depicted in FIGS. 2 and 3):

| | Total | First Half | Second Half |
|---|---|---|---|
| Range-X | −64.35-68.53 | −64.35-68.53 | −13.81-16.92 |
| Range-Y | −79.83-77.74 | −79.83-77.74 | −13.32-13.19 |
| Range-Z | −6.96-2.89 | −4.07-2.89 | −6.96--0.32 |

It is apparent from the table that when the data is split by volume, there are no clear boundaries between data segments along any of the coordinate axes due to the sequence in which the 3D capture device sweeps the field of view (for example, a LiDAR may sense the external periphery of the field of view first and work its way inward). This may result in very complex combination logic. For example, determining whether multiple data segments include portions of the same object (i.e., an overlapping object) is not a straight-forward endeavor. As another example, once an overlapping object is determined, determining the unified contours and location of the object is complicated. Splitting the data segments by volume generally results in an increased number of overlapping objects relative to other splitting schemes described herein. In general, when the data is split by volume, the number of 3D point clouds of detected objects to be combined across the parallel segments is close to the number of objects in the scene.

FIG. 4 depicts a scene 402 annotated with detected objects and a graph 404 of objects detected within the scene 402. FIG. 5 depicts a scene 502 annotated with detected objects and a graph 504 of objects detected within the scene 502. The graphs 404 and 504 depict boundaries of objects detected in the associated data segments. The graphs include an X, Y, Z coordinate space in which the vehicle position is (0, 0, 0).

The depicted scenes 402 and 502 are identical to scenes 202 and 302, but in this example the 3D spatial data has been split into two data segments using Y-axis based division. In this embodiment, a clear boundary on the Y-axis separates the two segments. This boundary results in a reduced number of overlapping objects and simplified processing for object combination, thus accelerating the combination process. In the embodiment depicted, only two objects overlap and are subject to combination (object number 3 from the first data segment, i.e., the segment shown by graph 404, is combined with object number 1 from the second data segment, i.e., the segment shown by graph 504) and object number 5 from the first data segment is combined with object number 10 from the second data segment).

In some embodiments, the parallel data segments are equal width segments (i.e., they each cover the same width of Y coordinates). For example, in the depicted embodiment, the first data segment in graph 404 includes the data points with Y coordinate values from −20 to −4 (a width of 16 along the Y axis), while the data segment for in graph 504 includes the data points with Y coordinate values from −6 to 10 (also a width of 16 along the Y axis).

In various embodiments, the data segments are not all of equal width. For example, if a particular segment is not expected to include many objects, the segment may be wider than the other segments to distribute processing more equally. In some embodiments, the data segments that are towards the center of the vehicle (i.e., that have Y values closer to 0) may be narrower than the segments along the edges.

In various embodiments, the widths of the data segments may be dynamically adjusted based on conditions associated with the vehicle. For example, the width of particular data segments may be variable based on whether a vehicle is moving straight or is turning. Thus, when the vehicle is moving straight, a first set of widths may be used for the segments, and when the car is turning, a second set of widths may be used for the segments (where at least one of the widths of a data segment has a different value in the second set than in the first set).

In various embodiments, since the object detection algorithm may be adaptive in nature, e.g., the parameters for segmentation are computed based on the data distribution in each data segment, an object which would not get detected as separate object if the scene was processed as a single data segment due to their proximity to another object may be detected as a separate object when the scene is processed as multiple data segments. Thus, segment-wise computation of parameters may increase the resolution of object detection and the detection accuracy.

Figure 6:
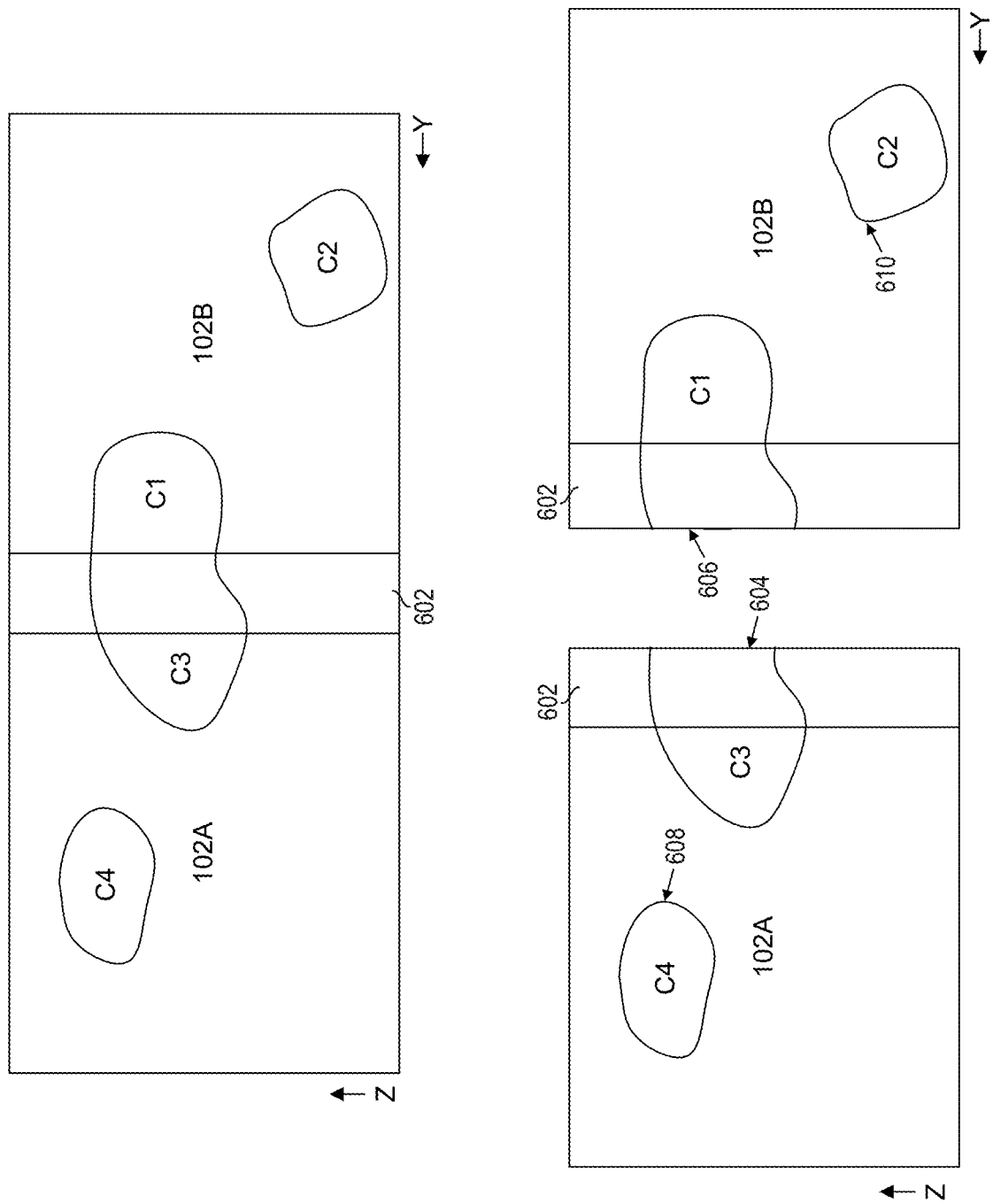
FIG. 6 illustrates an example flow for detecting an overlapping object in accordance with certain embodiments.

FIG. 6 illustrates an example flow for detecting an overlapping object in accordance with certain embodiments. In the upper portion of the figure, two neighboring data segments 102A and 102B that have been divided along the Y axis are shown. A boundary between the two data segments may be defined by an overlapping segment 602 that includes all data points with Y coordinates within a range (which could be as small as one of the Y values). For example, for each Y coordinate included within the overlapping region 602, the overlapping region 602 may include numerous data points with various X and Z coordinates. The overlapping region 602 may be any suitable width in the Y direction. In a first embodiment, the overlapping region 602 is one coordinate unit wide. In other embodiments, the overlapping region 602 may be two, three, or more coordinate units wide. Wider overlapping regions 602 are more robust against noise but may lead to more overlapping objects and associated computations. In various embodiments, the width of an overlapping region 602 may be fixed, adjustable by a user, or dynamically adjustable based on, e.g., noise conditions.

When data segment 102A is provided to scan module 104A, the data segment 102A includes the overlapping region 602. Similarly, when data segment 102B is provided to scan module 104B, the data segment 104B also includes the overlapping region 602.

The data segments may include any number of objects, some of which may be overlapping objects, that is, objects that appear in at least two neighboring data segments. For example, data segment 102A includes object C3 and object C4, while data segment 102B includes objects C1 and C2.

The lower portion of FIG. 6 depicts the data segments 102A and 102B in isolation. When a data segment 102 is processed by a scan module 104, for each object detected within the data segment 102, a determination of whether the object overlaps with an object of a neighboring data segment is made. In one embodiment, the determination may include an identification of a Y min or a Y max value for the object and a determination of whether that Y min or Y max value lies in the overlap region 602. As an example, for data segment 102A, a Y min value 604 for object C3 is determined and a Y min value 608 for object C4 is determined. In the depicted embodiment the Y values increase from the right to the left, so the Y min values for the objects in data segment 102A represent the points of the objects that are furthest to the right. The Y min values determined for the objects may be analyzed to determine if they lie in the overlap segment 602. For example, they may be compared against the Y value of the overlap segment (if the overlap segment is a single coordinate unit wide) or the maximum Y value of the overlap segment (if the overlap segment is multiple coordinate units wide). If a Y min value lies in the overlap region, the corresponding object is determined to be an overlapping object. Thus, because Y min 604 lies in the overlap segment 602, object C3 is determined to be an overlapping object, but since Y min 608 does not lie in the overlap segment 602, object C4 is determined to not be an overlapping object.

For data segment 102B, a Y max value 606 is determined for object C1 and a Y max value 610 is determined for object C2. The Y max values for the objects in data segment 102B represent the points of the objects that are furthest to the left. The Y max values determined for the objects may be analyzed to determine whether they lie in the overlap data segment 602. For example, they may be compared against the Y value of the overlap segment (if the overlap segment is a single coordinate unit) or the minimum Y value of the overlap segment (if the overlap segment is multiple coordinate units wide). If a Y max value lies in the overlap segment, the corresponding object is determined to be an overlapping object. Thus, because Y max 606 lies in the overlap segment 602, object C1 is determined to be an overlapping object, but since Y max 610 does not lie in the overlap segment 602, object C2 is determined to not be an overlapping object. For data segment 102B, Y min values do not need to be determined for the objects, because there is no neighboring data segment to the right of data segment 102B.

Once the overlapping objects (C1 and C3 in this example) are identified, a determination is made as to which objects from data segment 102A and data segment 102B are the same objects. In this example, the determination is relatively easy because there is only one overlapping object from each data segment, thus object C3 is the same object as object C1. However, when each data segment includes multiple overlapping objects, a 3D point (having an X coordinate, a Y coordinate, and a Z coordinate) corresponding to the Y max value for an object of data segment 102B is determined and compared against boundaries of objects of segment 102B to determine which object from 102A corresponds to the object that includes the 3D point. Alternatively, a 3D point corresponding to the Y min value for an object of data segment 102A could be determined and compared against boundaries of objects of segment 102A to determine which object from 102B corresponds to the object that includes the 3D point.

Figure 7:
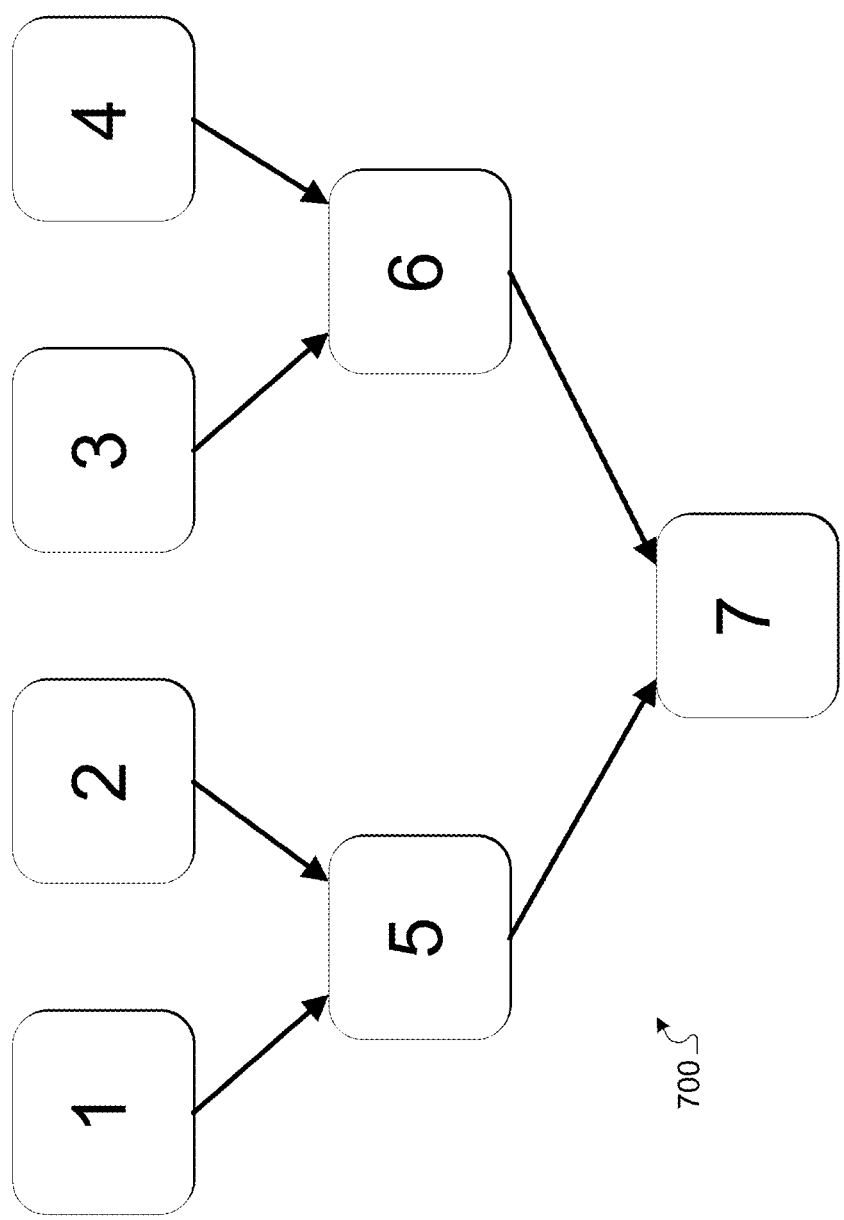
FIG. 7 illustrates a first architectural flow of parallel combination module in accordance with certain embodiments.
Figure 8:
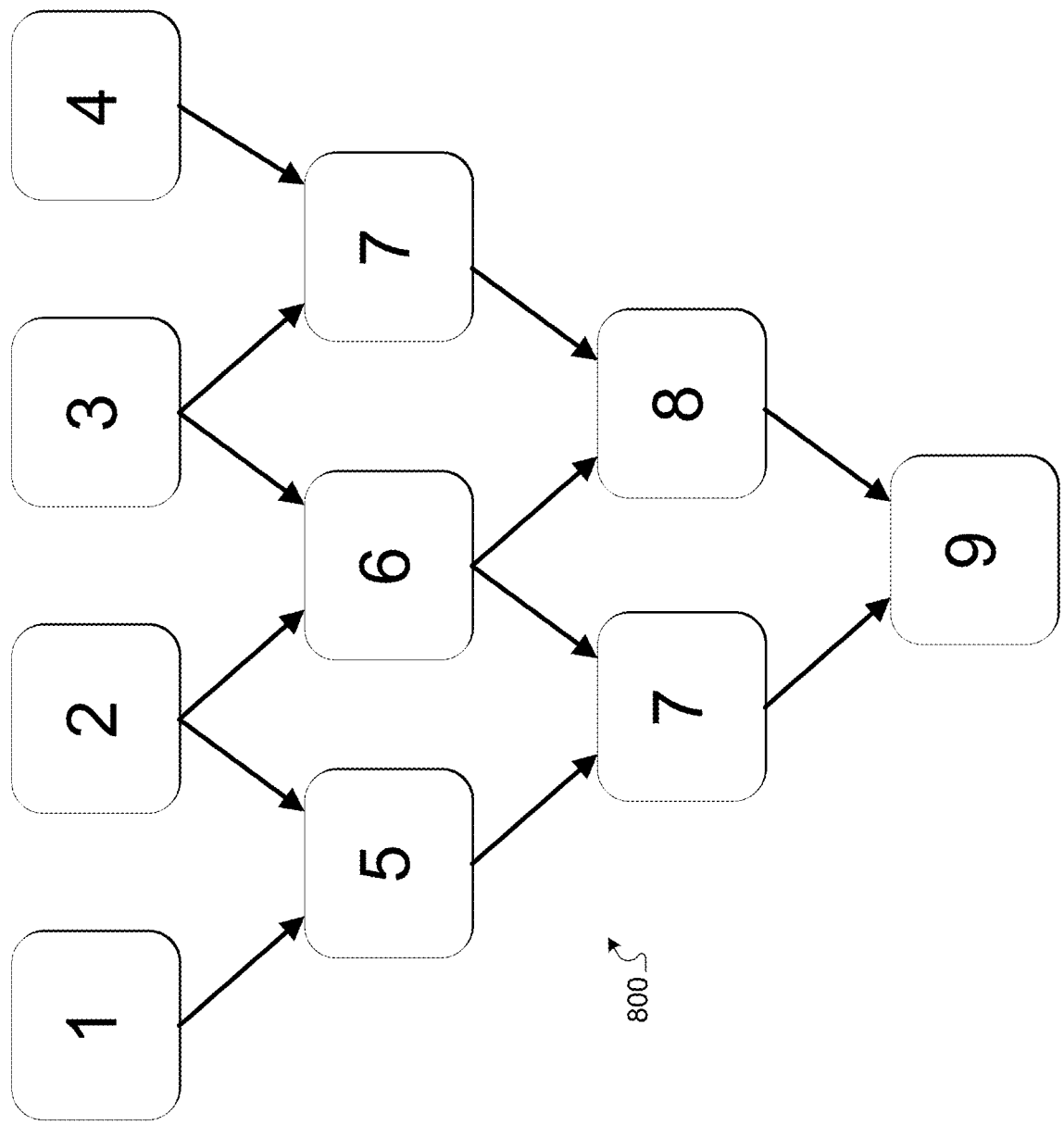
FIG. 8 illustrates a second architectural flow of parallel combination module in accordance with certain embodiments.
Figure 9:
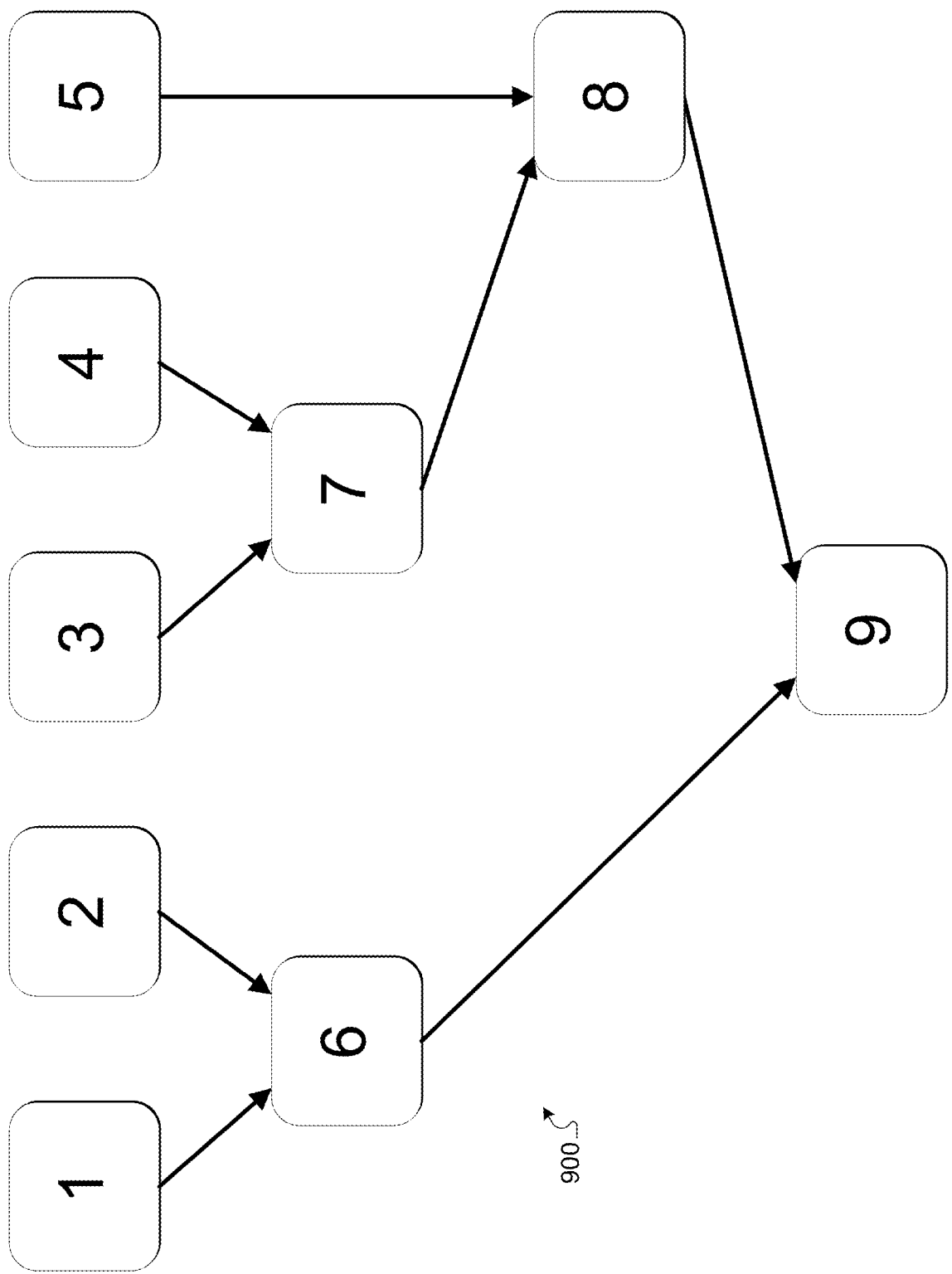
FIG. 9 illustrates a third architectural flow of parallel combination module in accordance with certain embodiments.

FIG. 7 illustrates a first architectural flow 700 of parallel combination module 106 in accordance with certain embodiments. Architectural flow 700 depicts a combination of objects detected within multiple parallel data segments 102. In FIGS. 7-9, each numbered box (e.g., boxes 1-7 in FIG. 7) represents an object list generated based on a parallel data segment 102 or a combined object list (e.g., the combination of two object lists generated based on parallel data segments 102, the combination of an object list generated based on a parallel data segment 102 and another combined object list, or a combination of combined object lists) wherein an object list may include information about objects (e.g., positions and boundaries of the objects) detected within one or more data segments 102. The first row of object lists 1-4 each represent, e.g., outputs of a plurality of scan modules 104. For example, object list 1 may represent the output of scan module 104A which is based on a first data segment 102A, object list 2 may represent the output of scan module 104B which is based on a second data segment 102B, and so on.

In architectural flow 700, the objects of object list 1 and object list 2 are combined to produce object list 5. The combination processing of object lists 1 and 2 may include determining whether any of the detected objects of object lists 1 and 2 overlap (i.e., whether an object includes a portion in object list 1 and object list 2), and if so, combining each pair of overlapping objects into a single unified object. The objects of object lists 1 and 2 that don't overlap are also included in object list 5. Object lists 3 and 4 are combined in a similar manner to produce object list 6. Object lists 5 and 6 are then combined to produce object list 7 (e.g., unified objects list 108). The combinations of pairs of object lists may be performed in parallel by separate processing elements. For example, a first processing element may combine object lists 1 and 2 while a second processing element is combining object lists 3 and 4. In some embodiments, an additional processing element may combine object lists 5 and 6 while the first and second processing elements are combining object lists for a subsequent time step from the time step for which object lists 1 through 4 were gathered. As one alternative, either the first or second processing element may also combine object lists 5 and 6.

The architecture 700 implements an inverted binary tree approach. While this approach may process data quickly, in order to achieve optimal efficiency, the number of input object lists is constrained to be a power of 2 (e.g., 2, 4, 8, 16, etc.).

FIG. 8 illustrates a second architectural flow 800 of parallel combination module 106 in accordance with certain embodiments. In architectural flow 800, during the first stage, object lists 1 and 2 are combined to produce object list 5, object lists 2 and 3 are combined to produce object list 6, and object lists 3 and 4 are combined to produce object list 7. In the second stage, object lists 5 and 6 are combined to produce object list 7 and object lists 6 and 7 are combined to produce object list 8. In the third stage, object lists 7 and 8 are combined to produce object list 9 (e.g., unified objects list 108). While architecture 800 has the advantage of being compatible with any number of input object lists, it suffers from the drawback of an increased number of combinations and thus relatively high combination processing.

FIG. 9 illustrates a third architectural flow 900 of parallel combination module 106 in accordance with certain embodiments. Architectural flow 900 is a modified binary tree that may support any number of input object lists as with architecture 800, while maintaining the efficiency advantages of architectural flow 700.

In architectural flow 900, whenever a stage includes an odd number of object lists to be processed, one of the object lists skips a stage of processing. In various embodiments, the object list from either edge (e.g., the object list covering the largest Y values or the object list covering the lowest Y values) is selected to skip a stage of processing. In various embodiments, if an object list skipped a stage of processing, it does not skip the next stage of processing, even if an odd number of object lists is to be processed in that next stage.

In the embodiment depicted, the first stage includes an odd number (5) of object lists to be processed. Thus, one of these object lists (object list 5) is selected to skip the first stage. During the first stage, object lists 1 and 2 are combined to form object list 6, and object lists 3 and 4 are combined to form object list 7. At this point, 3 object lists (5, 6, and 7) remain to be processed. Because object list 5 already skipped the first stage of processing, it is combined with object list 7 during the second stage of processing, and object list 6 is selected to skip the second stage of processing. During the second stage of processing object lists 5 and 7 are combined to produce object list 8. During the third stage of processing object lists 6 and 8 are combined to produce object list 9 (e.g., unified objects list 108). As described above, architectural flow 900 allows for the combination of any number of parallel segments, while retaining the reduced number of combinations offered by architectural flow 700. The number of combinations for various numbers of parallel segments 102 (which may each be processed by a respective scan module 106 to generate an object list) is depicted in the table below:

| Number of Parallel Data Segments | Architecture 700 | Architecture 800 | Architecture 900 |
| --- | --- | --- | --- |
| 2 | 1 | 1 | 1 |
| 3 | | 3 | 2 |
| 4 | 3 | 6 | 3 |
| 5 | | 10 | 4 |
| 6 | | 15 | 5 |
| 7 | | 21 | 6 |
| 8 | 7 | 29 | 7 |
| 16 | 15 | 120 | 15 |

Figure 10:
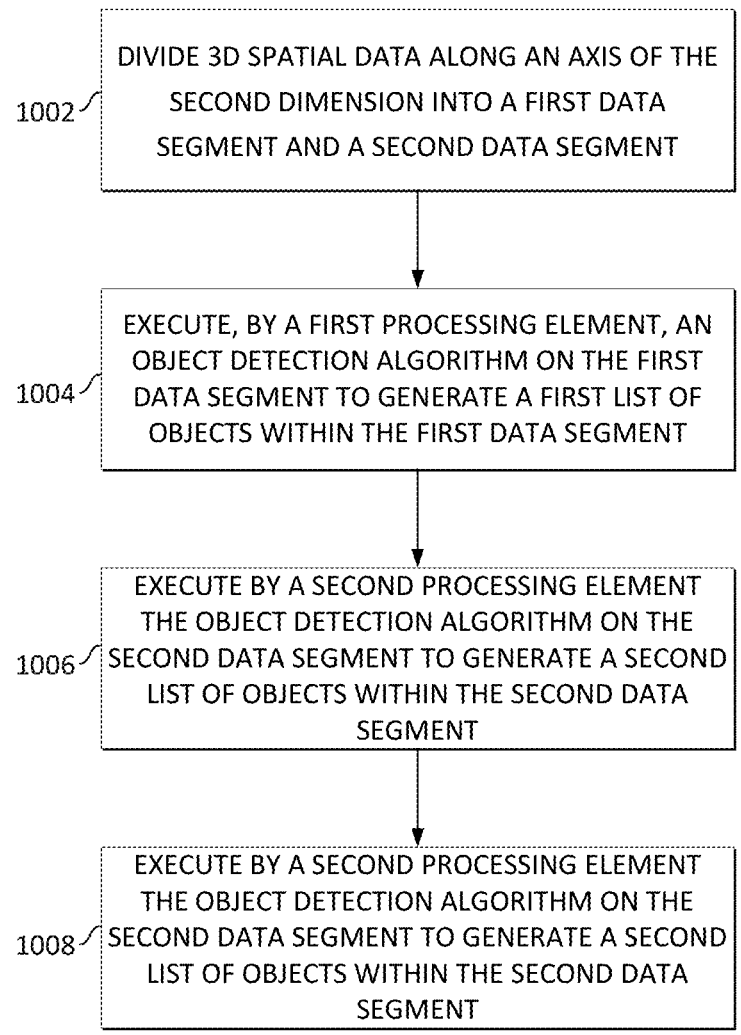
FIG. 10 illustrates a flow for generating a unified object list based on a plurality of data segments in accordance with certain embodiments.

FIG. 10 illustrates a flow for generating a unified object list based on a plurality of data segments in accordance with certain embodiments. At 1002, 3D spatial data is divided along an axis of the second dimension into a first data segment and a second data segment, such that the first data segment is limited to data points of the 3D spatial data with second dimension coordinates within a first range and the second data segment is limited to data points of the 3D spatial data with second dimension coordinates within a second range. At 1004, a first processing element executes an object detection algorithm on the first data segment to generate a first list of objects within the first data segment. At 1006, a second processing element executes the object detection algorithm on the second data segment to generate a second list of objects within the second data segment. At 1008, a first set of objects detected in the first data segment is combined with a second set of objects detected in the second data segment.

FIGS. 11-16 illustrate example environments in which various aspects of the present disclosure may operate or various components that may be used to perform operations described herein. For example, one or more of a segment division module (which may be used to divide 3D spatial data into two or more data segments 102), scan modules 104 or parallel combination module 106 may be implemented by a processor, such as in-vehicle processing system 1210, processor 1500, or other suitable combination of circuitry (which in some cases may include a computer readable medium with instructions for execution of various operations described herein). In some embodiments, parallelization may be achieved (e.g., during the object detection phase and/or the object list combination phase by utilizing a plurality of processing elements simultaneously, where a processing element may refer to any suitable combination of circuitry, such as FPGAs, processor cores, GPUs, accelerators, or portions thereof (e.g., any of these may include multiple processing elements). In various embodiments, any one or more operations described herein may be performed in-vehicle or by one or more servers coupled to a vehicle (various processing environments are described in more detail below).

Figure 11:
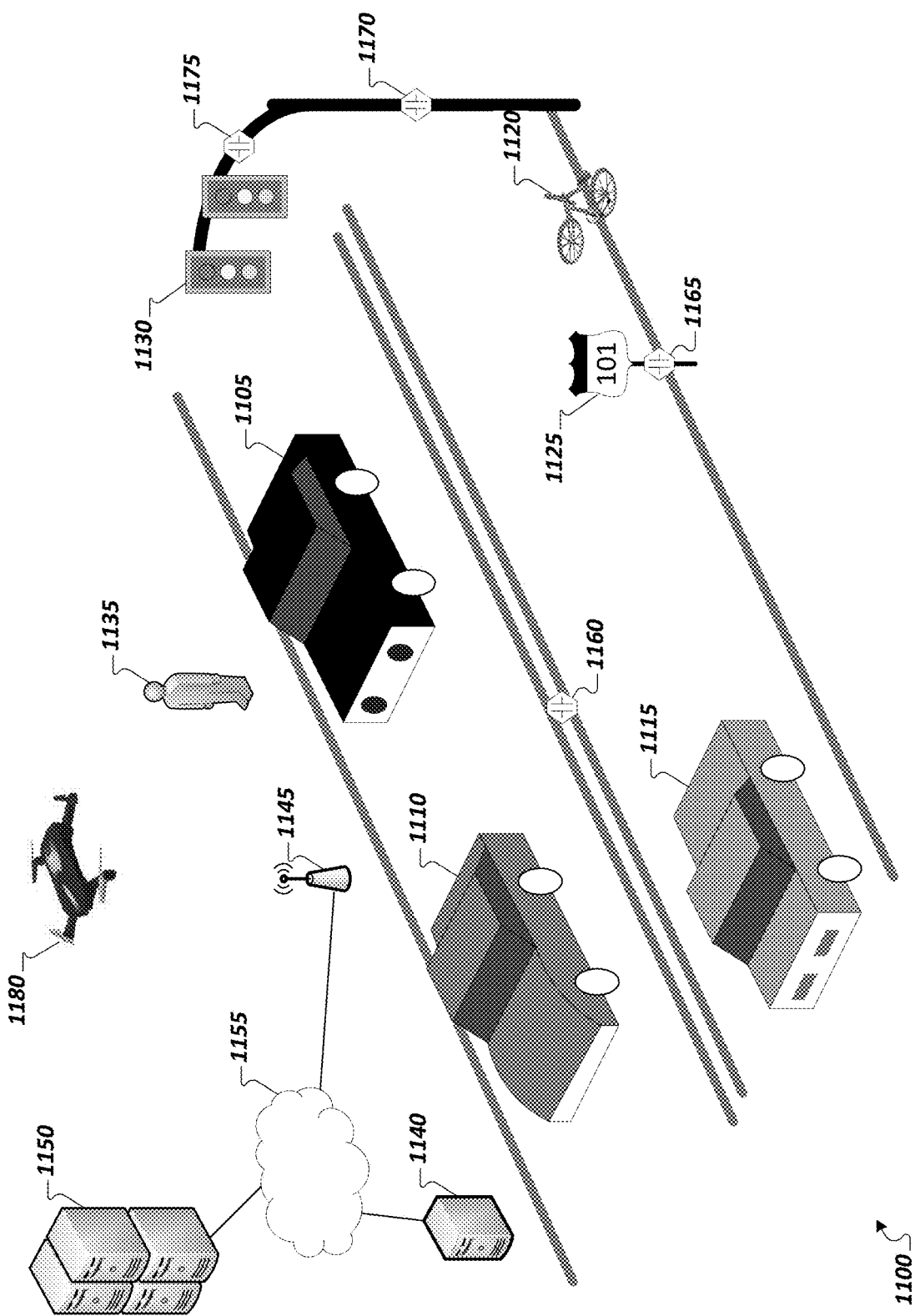
FIG. 11 is a simplified illustration showing an example autonomous driving environment in accordance with certain embodiments.

FIG. 11 is a simplified illustration 1100 showing an example autonomous driving environment. Vehicles (e.g., 1105, 1110, 1115, etc.) may be provided with varying levels of autonomous driving capabilities facilitated through in-vehicle computing systems with logic implemented in hardware, firmware, and/or software to enable respective autonomous driving stacks. Such autonomous driving stacks may allow vehicles to self-control or provide driver assistance to detect roadways, navigate from one point to another, detect other vehicles and road actors (e.g., pedestrians (e.g., 1135), bicyclists, etc.), detect obstacles and hazards (e.g., 1120), and road conditions (e.g., traffic, road conditions, weather conditions, etc.), and adjust control and guidance of the vehicle accordingly.

In some implementations, vehicles (e.g., 1105, 1110, 1115) within the environment may be "connected" in that the in-vehicle computing systems include communication modules to support wireless communication using one or more technologies (e.g., Institute of Electrical and Electronics Engineers (IEEE) 802.11 communications (e.g., WiFi), cellular data networks (e.g., 3rd Generation Partnership Project (3GPP) networks, Global System for Mobile Communication (GSM), general packet radio service, code division multiple access (CDMA), etc.), Bluetooth, millimeter wave (mmWave), ZigBee, Z-Wave, etc.), allowing the in-vehicle computing systems to connect to and communicate with other computing systems, such as the in-vehicle computing systems of other vehicles or supporting infrastructure. For instance, in some implementations, vehicles (e.g., 1105, 1110, 1115) may communicate with computing systems providing sensors, data, and services in support of the vehicles' autonomous driving capabilities. For instance, as shown in the illustrative example of FIG. 11, supporting drones 1180 (e.g., ground-based and/or aerial), roadside computing devices (e.g., 1140), various external (to the vehicle, or "extraneous") sensor devices (e.g., 1160, 1165, 1170, 1175, etc.), and other devices may be provided as autonomous driving infrastructure separate from the computing systems, sensors, and logic implemented on the vehicles (e.g., 1105, 1110, 1115) to support and improve autonomous driving results provided through the vehicles, among other examples. Vehicles may also communicate with other connected vehicles over wireless communication channels to share data and coordinate movement within an autonomous driving environment, among other example communications.

As illustrated in the example of FIG. 11, autonomous driving infrastructure may incorporate a variety of different systems. Such systems may vary depending on the location, with more developed roadways (e.g., roadways controlled by specific municipalities or toll authorities, roadways in urban areas, sections of roadways known to be problematic for autonomous vehicles, etc.) having a greater number or more advanced supporting infrastructure devices than other sections of roadway, etc. For instance, supplemental sensor devices (e.g., 1160, 1165, 1170, 1175) may be provided, which include sensors for observing portions of roadways and vehicles moving within the environment and generating corresponding data describing or embodying the observations of the sensors. As examples, sensor devices may be embedded within the roadway itself (e.g., sensor 1160), on roadside or overhead signage (e.g., sensor 1165 on sign 1125), sensors (e.g., 1170, 1175) attached to electronic roadside equipment or fixtures (e.g., traffic lights (e.g., 1130), electronic road signs, electronic billboards, etc.), dedicated road side units (e.g., 1140), among other examples. Sensor devices may also include communication capabilities to communicate their collected sensor data directly to nearby connected vehicles or to fog- or cloud-based computing systems (e.g., 1140, 1150). Vehicles may obtain sensor data collected by external sensor devices (e.g., 1160, 1165, 1170, 1175, 1180), or data embodying observations or recommendations generated by other systems (e.g., 1140, 1150) based on sensor data from these sensor devices (e.g., 1160, 1165, 1170, 1175, 1180), and use this data in sensor fusion, inference, path planning, and other tasks performed by the in-vehicle autonomous driving system. In some cases, such extraneous sensors and sensor data may, in actuality, be within the vehicle, such as in the form of an after-market sensor attached to the vehicle, a personal computing device (e.g., smartphone, wearable, etc.) carried or worn by passengers of the vehicle, etc. Other road actors, including pedestrians, bicycles, drones, electronic scooters, etc., may also be provided with or carry sensors to generate sensor data describing an autonomous driving environment, which may be used and consumed by autonomous vehicles, cloud- or fog-based support systems (e.g., 1140, 1150), other sensor devices (e.g., 1160, 1165, 1170, 1175, 1180), among other examples.

As autonomous vehicle systems may possess varying levels of functionality and sophistication, support infrastructure may be called upon to supplement not only the sensing capabilities of some vehicles, but also the computer and machine learning functionality enabling autonomous driving functionality of some vehicles. For instance, compute resources and autonomous driving logic used to facilitate machine learning model training and use of such machine learning models may be provided on the in-vehicle computing systems entirely or partially on both the in-vehicle systems and some external systems (e.g., 1140, 1150). For instance, a connected vehicle may communicate with roadside units, edge systems, or cloud-based devices (e.g., 1140) local to a particular segment of roadway, with such devices (e.g., 1140) capable of providing data (e.g., sensor data aggregated from local sensors (e.g., 1160, 1165, 1170, 1175, 1180) or data reported from sensors of other vehicles), performing computations (as a service) on data provided by a vehicle to supplement the capabilities native to the vehicle, and/or push information to passing or approaching vehicles (e.g., based on sensor data collected at the device 1140 or from nearby sensor devices, etc.). A connected vehicle (e.g., 1105, 1110, 1115) may also or instead communicate with cloud-based computing systems (e.g., 1150), which may provide similar memory, sensing, and computational resources to enhance those available at the vehicle. For instance, a cloud-based system (e.g., 1150) may collect sensor data from a variety of devices in one or more locations and utilize this data to build and/or train machine-learning models which may be used at the cloud-based system (to provide results to various vehicles (e.g., 1105, 1110, 1115) in communication with the cloud-based system 1150, or to push to vehicles for use by their in-vehicle systems, among other example implementations. Access points (e.g., 1145), such as cell-phone towers, road-side units, network access points mounted to various roadway infrastructure, access points provided by neighboring vehicles or buildings, and other access points, may be provided within an environment and used to facilitate communication over one or more local or wide area networks (e.g., 1155) between cloud-based systems (e.g., 1150) and various vehicles (e.g., 1105, 1110, 1115). Through such infrastructure and computing systems, it should be appreciated that the examples, features, and solutions discussed herein may be performed entirely by one or more of such in-vehicle computing systems, fog-based or edge computing devices, or cloud-based computing systems, or by combinations of the foregoing through communication and cooperation between the systems.

In general, "servers," "clients," "computing devices," "network elements," "hosts," "platforms", "sensor devices," "edge device," "autonomous driving systems", "autonomous vehicles", "fog-based system", "cloud-based system", and "systems" generally, etc. discussed herein can include electronic computing devices operable to receive, transmit, process, store, or manage data and information associated with an autonomous driving environment. As used in this document, the term "computer," "processor," "processor device," or "processing device" is intended to encompass any suitable processing apparatus, including central processing units (CPUs), graphical processing units (GPUs), application specific integrated circuits (ASICs), field programmable gate arrays (FPGAs), digital signal processors (DSPs), tensor processors and other matrix arithmetic processors, among other examples. For example, elements shown as single devices within the environment may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

With reference now to FIG. 12, a simplified block diagram 1200 is shown illustrating an example implementation of a vehicle (and corresponding in-vehicle computing system) 1105 equipped with autonomous driving functionality. In one example, a vehicle 1105 may be equipped with one or more processors 1202, such as central processing units (CPUs), graphical processing units (GPUs), application specific integrated circuits (ASICs), field programmable gate arrays (FPGAs), digital signal processors (DSPs), tensor processors and other matrix arithmetic processors, among other examples. Such processors 1202 may be coupled to or have integrated hardware accelerator devices (e.g., 1204), which may be provided with hardware to accelerate certain processing and memory access functions, such as functions relating to machine learning inference or training, processing of particular sensor data (e.g., camera image data, LIDAR point clouds, etc.), performing certain arithmetic functions pertaining to autonomous driving (e.g., matrix arithmetic, convolutional arithmetic, etc.), among other examples. One or more memory elements (e.g., 1206) may be provided to store machine-executable instructions implementing all or a portion of any one of the modules or sub-modules of an autonomous driving stack implemented on the vehicle, as well as storing machine learning models (e.g., 1256), sensor data (e.g., 1258), and other data received, generated, or used in connection with autonomous driving functionality to be performed by the vehicle (or used in connection with the examples and solutions discussed herein). Various communication modules (e.g., 1212) may also be provided, implemented in hardware circuitry and/or software to implement communication capabilities used by the vehicle's system to communicate with other extraneous computing systems over one or more network channels employing one or more network communication technologies. These various processors 1202, accelerators 1204, memory devices 1206, and network communication modules 1212, may be interconnected on the vehicle system through one or more interconnect fabrics or links (e.g., 1208), such as fabrics utilizing technologies such as a Peripheral Component Interconnect Express (PCIe), Ethernet, OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centrig™ interconnect, among others.

Continuing with the example of FIG. 12, an example vehicle (and corresponding in-vehicle computing system) 1105 may include an in-vehicle processing system 1210, driving controls (e.g., 1220), sensors (e.g., 1225), and user/passenger interface(s) (e.g., 1230), among other example modules implemented functionality of the autonomous vehicle in hardware and/or software. For instance, an in-vehicle processing system 1210, in some implementations, may implement all or a portion of an autonomous driving stack and process flow (e.g., as shown and discussed in the example of FIG. 5). A machine learning engine 1232 may be provided to utilize various machine learning models (e.g., 1256) provided at the vehicle 1105 in connection with one or more autonomous functions and features provided and implemented at or for the vehicle, such as discussed in the examples herein. Such machine learning models 1256 may include artificial neural network models, convolutional neural networks, decision tree-based models, support vector machines (SVMs), Bayesian models, deep learning models, and other example models. In some implementations, an example machine learning engine 1232 may include one or more model trainer engines 1252 to participate in training (e.g., initial training, continuous training, etc.) of one or more of the machine learning models 1256. One or more inference engines 1254 may also be provided to utilize the trained machine learning models 1256 to derive various inferences, predictions, classifications, and other results.

The machine learning engine(s) 1232 provided at the vehicle may be utilized to support and provide results for use by other logical components and modules of the in-vehicle processing system 1210 implementing an autonomous driving stack and other autonomous-driving-related features. For instance, a data collection module 1234 may be provided with logic to determine sources from which data is to be collected (e.g., for inputs in the training or use of various machine learning models 1256 used by the vehicle). For instance, the particular source (e.g., internal sensors (e.g., 1225) or extraneous sources (e.g., 1115, 1140, 1150, 1180, 1215, etc.)) may be selected, as well as the frequency and fidelity at which the data is sampled is selected. In some cases, such selections and configurations may be made at least partially autonomously by the data collection module 1234 using one or more corresponding machine learning models (e.g., to collect data as appropriate given a particular detected scenario).

A sensor fusion module 1236 may also be used to govern the use and processing of the various sensor inputs utilized by the machine learning engine 1232 and other modules (e.g., 1238, 1240, 1242, 1244, 1246, etc.) of the in-vehicle processing system. One or more sensor fusion modules (e.g., 1236) may be provided, which may derive an output from multiple sensor data sources (e.g., on the vehicle or extraneous to the vehicle). The sources may be homogenous or heterogeneous types of sources (e.g., multiple inputs from multiple instances of a common type of sensor, or from instances of multiple different types of sensors). An example sensor fusion module 1236 may apply direct fusion, indirect fusion, among other example sensor fusion techniques. The output of the sensor fusion may, in some cases by fed as an input (along with potentially additional inputs) to another module of the in-vehicle processing system and/or one or more machine learning models in connection with providing autonomous driving functionality or other functionality, such as described in the example solutions discussed herein.

A perception engine 1238 may be provided in some examples, which may take as inputs various sensor data (e.g., 1258) including data, in some instances, from extraneous sources and/or sensor fusion module 1236 to perform object recognition and/or tracking of detected objects, among other example functions corresponding to autonomous perception of the environment encountered (or to be encountered) by the vehicle 1105. Perception engine 1238 may perform object recognition from sensor data inputs using deep learning, such as through one or more convolutional neural networks and other machine learning models 1256. Object tracking may also be performed to autonomously estimate, from sensor data inputs, whether an object is moving and, if so, along what trajectory. For instance, after a given object is recognized, a perception engine 1238 may detect how the given object moves in relation to the vehicle. Such functionality may be used, for instance, to detect objects, such as other vehicles, pedestrians, wildlife, cyclists, etc. moving within an environment, which may affect the path of the vehicle on a roadway, among other example uses.

A localization engine 1240 may also be included within an in-vehicle processing system 1210 in some implementation. In some cases, localization engine 1240 may be implemented as a sub-component of a perception engine 1238. The localization engine 1240 may also make use of one or more machine learning models 1256 and sensor fusion (e.g., of LIDAR and GPS data, etc.) to determine a high confidence location of the vehicle and the space it occupies within a given physical space (or "environment").

A vehicle 1105 may further include a path planner 1242, which may make use of the results of various other modules, such as data collection (e.g., 1234), sensor fusion (e.g., 1236), perception engine (e.g., 1238,) and localization engine (e.g., 1240) among others (e.g., recommendation engine 1244) to determine a path plan and/or action plan for the vehicle, which may be used by drive controls (e.g., 1220) to control the driving of the vehicle 1105 within an environment. For instance, a path planner 1242 may utilize these inputs and one or more machine learning models to determine probabilities of various events within a driving environment to determine effective real-time plans to act within the environment.

In some implementations, the vehicle 1105 may include one or more recommendation engines 1244 to generate various recommendations from sensor data generated by the vehicle's 1105 own sensors (e.g., 1225) as well as sensor data from extraneous sensors (e.g., sensor devices 1115, 1180, 1215, etc.). Some recommendations may be determined by the recommendation engine 1244, which may be provided as inputs to other components of the vehicle's autonomous driving stack to influence determinations that are made by these components. For instance, a recommendation may be determined, which, when considered by a path planner 1242, causes the path planner 1242 to deviate from decisions or plans it would ordinarily otherwise determine, but for the recommendation. Recommendations may also be generated by recommendation engines (e.g., 1244) based on considerations of passenger comfort and experience. In some cases, interior features within the vehicle may be manipulated predictively and autonomously based on these recommendations (which are determined from sensor data (e.g., 1258) captured by the vehicle's sensors and/or extraneous sensors, etc.

As introduced above, some vehicle implementations may include user/passenger experience engines (e.g., 1246), which may utilize sensor data and outputs of other modules within the vehicle's autonomous driving stack to cause driving maneuvers and changes to the vehicle's cabin environment to enhance the experience of passengers within the vehicle based on the observations captured by the sensor data (e.g., 1258). In some instances, aspects of user interfaces (e.g., 1230) provided on the vehicle to enable users to interact with the vehicle and its autonomous driving system may be enhanced. In some cases, informational presentations may be generated and provided through user displays (e.g., audio, visual, and/or tactile presentations) to help affect and improve passenger experiences within a vehicle (e.g., 1105) among other example uses.

In some cases, a system manager 1250 may also be provided, which monitors information collected by various sensors on the vehicle to detect issues relating to the performance of a vehicle's autonomous driving system. For instance, computational errors, sensor outages and issues, availability and quality of communication channels (e.g., provided through communication modules 1212), vehicle system checks (e.g., issues relating to the motor, transmission, battery, cooling system, electrical system, tires, etc.), or other operational events may be detected by the system manager 1250. Such issues may be identified in system report data generated by the system manager 1250, which may be utilized, in some cases, as inputs to machine learning models 1256 and related autonomous driving modules (e.g., 1232, 1234, 1236, 1238, 1240, 1242, 1244, 1246, etc.) to enable vehicle system health and issues to also be considered along with other information collected in sensor data 1258 in the autonomous driving functionality of the vehicle 1105.

In some implementations, an autonomous driving stack of a vehicle 1105 may be coupled with drive controls 1220 to affect how the vehicle is driven, including steering controls (e.g., 1260), accelerator/throttle controls (e.g., 1262), braking controls (e.g., 1264), signaling controls (e.g., 1266), among other examples. In some cases, a vehicle may also be controlled wholly or partially based on user inputs. For instance, user interfaces (e.g., 1230), may include driving controls (e.g., a physical or virtual steering wheel, accelerator, brakes, clutch, etc.) to allow a human driver to take control from the autonomous driving system (e.g., in a handover or following a driver assist action). Other sensors may be utilized to accept user/passenger inputs, such as speech detection 1292, gesture detection cameras 1294, and other examples. User interfaces (e.g., 1230) may capture the desires and intentions of the passenger-users and the autonomous driving stack of the vehicle 1105 may consider these as additional inputs in controlling the driving of the vehicle (e.g., drive controls 1220). In some implementations, drive controls may be governed by external computing systems, such as in cases where a passenger utilizes an external device (e.g., a smartphone or tablet) to provide driving direction or control, or in cases of a remote valet service, where an external driver or system takes over control of the vehicle (e.g., based on an emergency event), among other example implementations.

As discussed above, the autonomous driving stack of a vehicle may utilize a variety of sensor data (e.g., 1258) generated by various sensors provided on and external to the vehicle. As an example, a vehicle 1105 may possess an array of sensors 1225 to collect various information relating to the exterior of the vehicle and the surrounding environment, vehicle system status, conditions within the vehicle, and other information usable by the modules of the vehicle's processing system 1210. For instance, such sensors 1225 may include global positioning (GPS) sensors 1268, light detection and ranging (LIDAR) sensors 1270, two-dimensional (2D) cameras 1272, three-dimensional (3D) or stereo cameras 1274, acoustic sensors 1276, inertial measurement unit (IMU) sensors 1278, thermal sensors 1280, ultrasound sensors 1282, bio sensors 1284 (e.g., facial recognition, voice recognition, heart rate sensors, body temperature sensors, emotion detection sensors, etc.), radar sensors 1286, weather sensors (not shown), among other example sensors. Sensor data 1258 may also (or instead) be generated by sensors that are not integrally coupled to the vehicle, including sensors on other vehicles (e.g., 1115) (which may be communicated to the vehicle 1105 through vehicle-to-vehicle communications or other techniques), sensors on ground-based or aerial drones 1180, sensors of user devices 1215 (e.g., a smartphone or wearable) carried by human users inside or outside the vehicle 1105, and sensors mounted or provided with other roadside elements, such as a roadside unit (e.g., 1140), road sign, traffic light, streetlight, etc. Sensor data from such extraneous sensor devices may be provided directly from the sensor devices to the vehicle or may be provided through data aggregation devices or as results generated based on these sensors by other computing systems (e.g., 1140, 1150), among other example implementations.

In some implementations, an autonomous vehicle system 1105 may interface with and leverage information and services provided by other computing systems to enhance, enable, or otherwise support the autonomous driving functionality of the device 1105. In some instances, some autonomous driving features (including some of the example solutions discussed herein) may be enabled through services, computing logic, machine learning models, data, or other resources of computing systems external to a vehicle. When such external systems are unavailable to a vehicle, it may be that these features are at least temporarily disabled. For instance, external computing systems may be provided and leveraged, which are hosted in road-side units or fog-based edge devices (e.g., 1140), other (e.g., higher-level) vehicles (e.g., 1115), and cloud-based systems 1150 (e.g., accessible through various network access points (e.g., 1145)). A roadside unit 1140 or cloud-based system 1150 (or other cooperating system, with which a vehicle (e.g., 1105) interacts may include all or a portion of the logic illustrated as belonging to an example in-vehicle processing system (e.g., 1210), along with potentially additional functionality and logic. For instance, a cloud-based computing system, road side unit 1140, or other computing system may include a machine learning engine supporting either or both model training and inference engine logic. For instance, such external systems may possess higher-end computing resources and more developed or up-to-date machine learning models, allowing these services to provide superior results to what would be generated natively on a vehicle's processing system 1210. For instance, an in-vehicle processing system 1210 may rely on the machine learning training, machine learning inference, and/or machine learning models provided through a cloud-based service for certain tasks and handling certain scenarios. Indeed, it should be appreciated that one or more of the modules discussed and illustrated as belonging to vehicle 1105 may, in some implementations, be alternatively or redundantly provided within a cloud-based, fog-based, or other computing system supporting an autonomous driving environment.

Various embodiments herein may utilize one or more machine learning models to perform functions of the AV stack (or other functions described herein). A machine learning model may be executed by a computing system to progressively improve performance of a specific task. In some embodiments, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various embodiments described herein may utilize one or more classification models. In a classification model, the outputs may be restricted to a limited set of values. The classification model may output a class for an input set of one or more input values. References herein to classification models may contemplate a model that implements, e.g., any one or more of the following techniques: linear classifiers (e.g., logistic regression or naïve Bayes classifier), support vector machines, decision trees, boosted trees, random forest, neural networks, or nearest neighbor.

Various embodiments described herein may utilize one or more regression models. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

Figure 13:
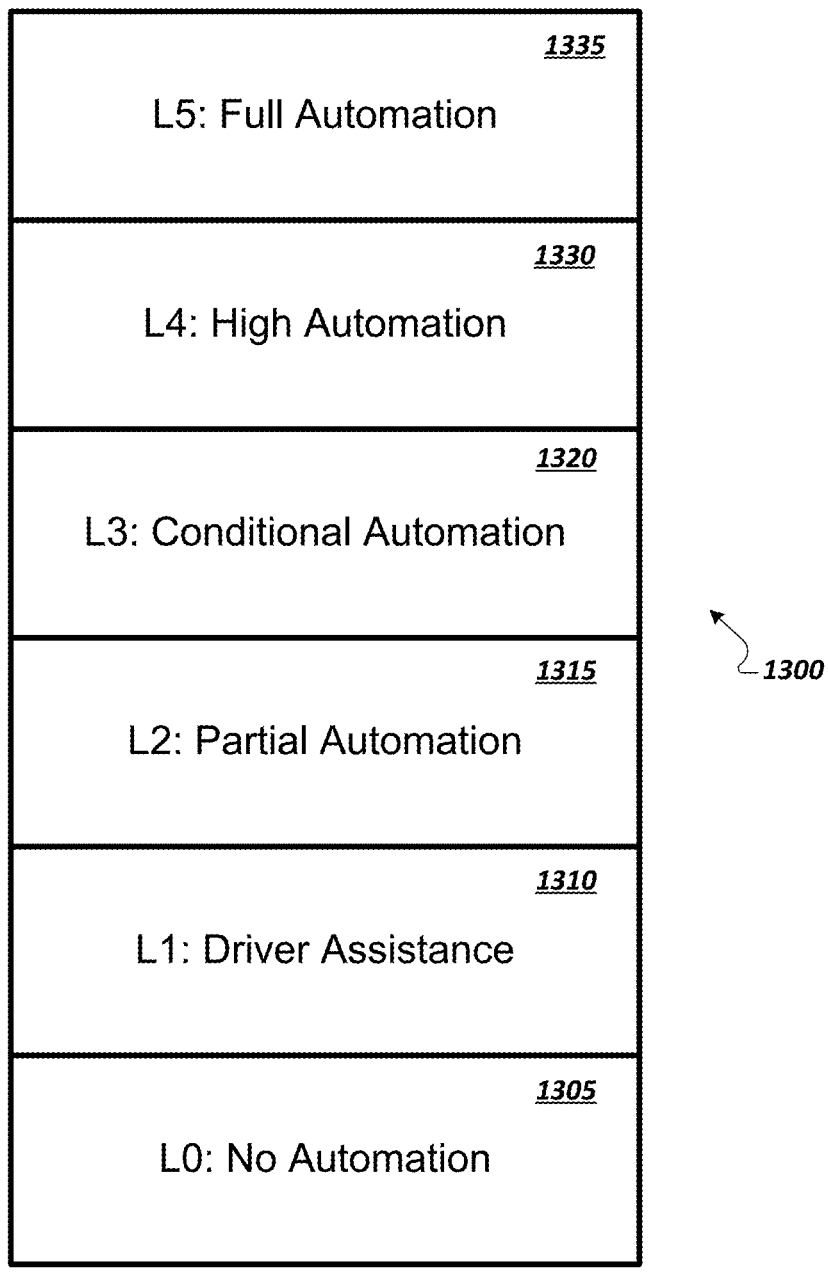
FIG. 13 is a simplified block diagram illustrating example levels of autonomous driving which may be supported in various vehicles (e.g., by their corresponding in-vehicle computing systems) in accordance with certain embodiments.

Turning to FIG. 13, a simplified block diagram 1300 is shown illustrating example levels of autonomous driving, which may be supported in various vehicles (e.g., by their corresponding in-vehicle computing systems). For instance, a range of levels may be defined (e.g., L0-L5 (1305-1335)), with level 5 (L5) corresponding to vehicles with the highest level of autonomous driving functionality (e.g., full automation), and level 0 (L0) corresponding the lowest level of autonomous driving functionality (e.g., no automation). For instance, an L5 vehicle (e.g., 1335) may possess a fully-autonomous computing system capable of providing autonomous driving performance in every driving scenario equal to or better than would be provided by a human driver, including in extreme road conditions and weather. An L4 vehicle (e.g., 1330) may also be considered fully-autonomous capable of performing safety-critical driving functions and effectively monitoring roadway conditions throughout an entire trip from a starting location to a destination. L4 vehicles may differ from L5 vehicles, in that an L4's autonomous capabilities are defined within the limits of the vehicle's "operational design domain," which may not include all driving scenarios. L3 vehicles (e.g., 1320) provide autonomous driving functionality to completely shift safety-critical functions to the vehicle in a set of specific traffic and environment conditions, but which still expect the engagement and availability of human drivers to handle driving in all other scenarios. Accordingly, L3 vehicles may provide handover protocols to orchestrate the transfer of control from a human driver to the autonomous driving stack and back. L2 vehicles (e.g., 1315) provide driver assistance functionality, which allow the driver to occasionally disengage from physically operating the vehicle, such that both the hands and feet of the driver may disengage periodically from the physical controls of the vehicle. L1 vehicles (e.g., 1310) provide driver assistance of one or more specific functions (e.g., steering, braking, etc.), but still require constant driver control of most functions of the vehicle. L0 vehicles may be considered not autonomous—the human driver controls all of the driving functionality of the vehicle (although such vehicles may nonetheless participate passively within autonomous driving environments, such as by providing sensor data to higher level vehicles, using sensor data to enhance GPS and infotainment services within the vehicle, etc.). In some implementations, a single vehicle may support operation at multiple autonomous driving levels. For instance, a driver may control and select which supported level of autonomy is used during a given trip (e.g., L4 or a lower level). In other cases, a vehicle may autonomously toggle between levels, for instance, based on conditions affecting the roadway or the vehicle's autonomous driving system. For example, in response to detecting that one or more sensors have been compromised, an L5 or L4 vehicle may shift to a lower mode (e.g., L2 or lower) to involve a human passenger in light of the sensor issue, among other examples.

Figure 14:
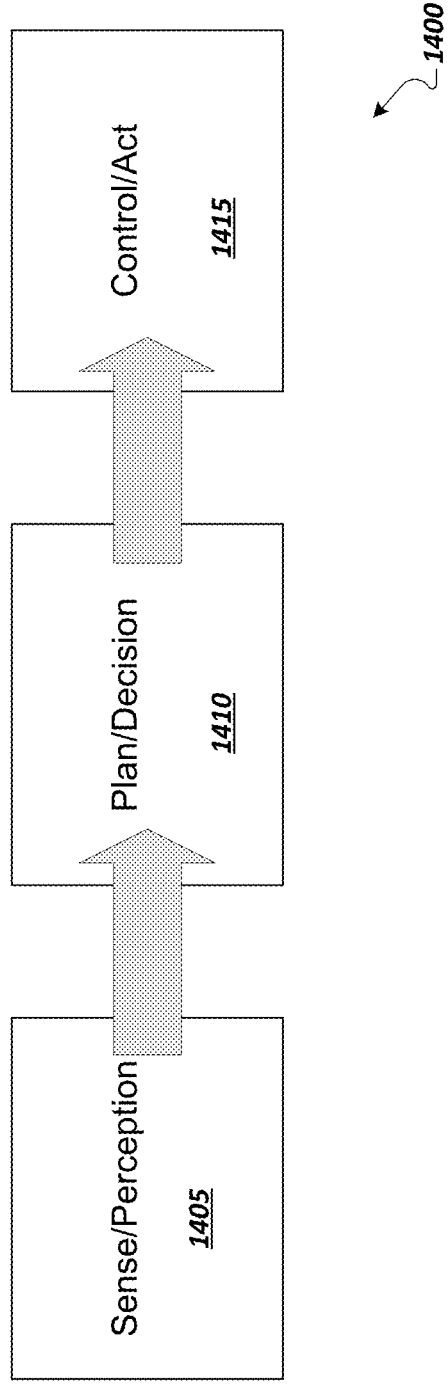
FIG. 14 is a simplified block diagram illustrating an example autonomous driving flow which may be implemented in some autonomous driving systems in accordance with certain embodiments.

FIG. 14 is a simplified block diagram 1400 illustrating an example autonomous driving flow which may be implemented in some autonomous driving systems. For instance, an autonomous driving flow implemented in an autonomous (or semi-autonomous) vehicle may include a sensing and perception stage 1405, a planning and decision stage 1410, and a control and action phase 1415. During a sensing and perception stage 1405 data is generated by various sensors and collected for use by the autonomous driving system. Data collection, in some instances, may include data filtering and receiving sensor from external sources. This stage may also include sensor fusion operations and object recognition and other perception tasks, such as localization, performed using one or more machine learning models. A planning and decision stage 1410 may utilize the sensor data and results of various perception operations to make probabilistic predictions of the roadway(s) ahead and determine a real time path plan based on these predictions. A planning and decision stage 1410 may additionally include making decisions relating to the path plan in reaction to the detection of obstacles and other events to decide on whether and what action to take to safely navigate the determined path in light of these events. Based on the path plan and decisions of the planning and decision stage 1410, a control and action stage 1415 may convert these determinations into actions, through actuators to manipulate driving controls including steering, acceleration, and braking, as well as secondary controls, such as turn signals, sensor cleaners, windshield wipers, headlights, etc.

Figure 15:
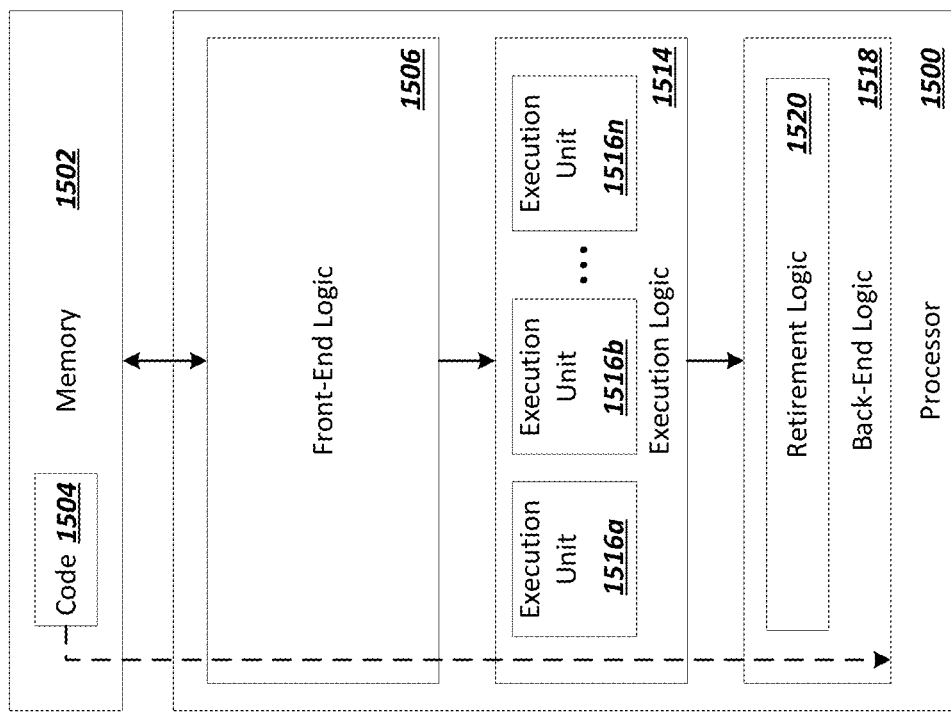
FIG. 15 is an example illustration of a processor in accordance with certain embodiments.
Figure 16:
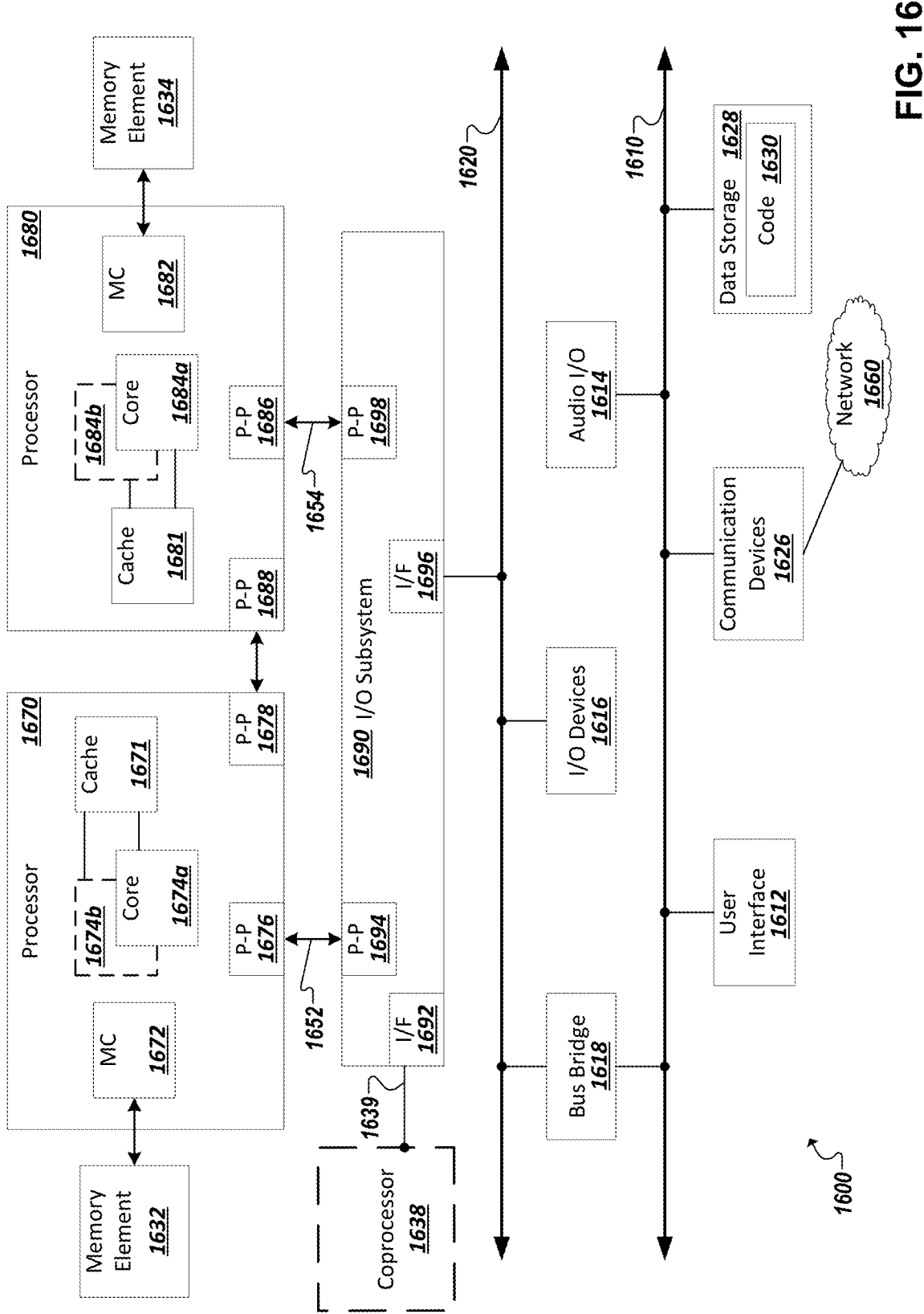
FIG. 16 illustrates a computing system that is arranged in a point-to-point (PtP) configuration in accordance with certain embodiments.

FIGS. 15-16 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 15-16.

FIG. 15 is an example illustration of a processor according to an embodiment. Processor 1500 is an example of a type of hardware device that can be used in connection with the implementations above. Processor 1500 may be any type of processor, such as a microprocessor, an embedded processor, a digital signal processor (DSP), a network processor, a multi-core processor, a single core processor, or other device to execute code. Although only one processor 1500 is illustrated in FIG. 15, a processing element may alternatively include more than one of processor 1500 illustrated in FIG. 15. Processor 1500 may be a single-threaded core or, for at least one embodiment, the processor 1500 may be multi-threaded in that it may include more than one hardware thread context (or "logical processor") per core.

FIG. 15 also illustrates a memory 1502 coupled to processor 1500 in accordance with an embodiment. Memory 1502 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1500 can execute any type of instructions associated with algorithms, processes, or operations detailed herein. Generally, processor 1500 can transform an element or an article (e.g., data) from one state or thing to another state or thing.

Code 1504, which may be one or more instructions to be executed by processor 1500, may be stored in memory 1502, or may be stored in software, hardware, firmware, or any suitable combination thereof, or in any other internal or external component, device, element, or object where appropriate and based on particular needs. In one example, processor 1500 can follow a program sequence of instructions indicated by code 1504. Each instruction enters a front-end logic 1506 and is processed by one or more decoders 1508. The decoder may generate, as its output, a micro operation such as a fixed width micro operation in a predefined format, or may generate other instructions, microinstructions, or control signals that reflect the original code instruction. Front-end logic 1506 also includes register renaming logic 1510 and scheduling logic 1512, which generally allocate resources and queue the operation corresponding to the instruction for execution.

Processor 1500 can also include execution logic 1514 having a set of execution units 1516a, 1516b, 1516n, etc. Some embodiments may include a number of execution units dedicated to specific functions or sets of functions. Other embodiments may include only one execution unit or one execution unit that can perform a particular function. Execution logic 1514 performs the operations specified by code instructions.

After completion of execution of the operations specified by the code instructions, back-end logic 1518 can retire the instructions of code 1504. In one embodiment, processor 1500 allows out of order execution but requires in order retirement of instructions. Retirement logic 1520 may take a variety of known forms (e.g., re-order buffers or the like). In this manner, processor 1500 is transformed during execution of code 1504, at least in terms of the output generated by the decoder, hardware registers and tables utilized by register renaming logic 1510, and any registers (not shown) modified by execution logic 1514.

Although not shown in FIG. 15, a processing element may include other elements on a chip with processor 1500. For example, a processing element may include memory control logic along with processor 1500. The processing element may include I/O control logic and/or may include I/O control logic integrated with memory control logic. The processing element may also include one or more caches. In some embodiments, non-volatile memory (such as flash memory or fuses) may also be included on the chip with processor 1500.

FIG. 16 illustrates a computing system 1600 that is arranged in a point-to-point (PtP) configuration according to an embodiment. In particular, FIG. 16 shows a system where processors, memory, and input/output devices are interconnected by a number of point-to-point interfaces. Generally, one or more of the computing systems described herein may be configured in the same or similar manner as computing system 1500.

Processors 1670 and 1680 may also each include integrated memory controller logic (MC) 1672 and 1682 to communicate with memory elements 1632 and 1634. In alternative embodiments, memory controller logic 1672 and 1682 may be discrete logic separate from processors 1670 and 1680. Memory elements 1632 and/or 1634 may store various data to be used by processors 1670 and 1680 in achieving operations and functionality outlined herein.

Processors 1670 and 1680 may be any type of processor, such as those discussed in connection with other figures. Processors 1670 and 1680 may exchange data via a point-to-point (PtP) interface 1650 using point-to-point interface circuits 1678 and 1688, respectively. Processors 1670 and 1680 may each exchange data with a chipset 1690 via individual point-to-point interfaces 1652 and 1654 using point-to-point interface circuits 1676, 1686, 1694, and 1698. Chipset 1690 may also exchange data with a co-processor 1638, such as a high-performance graphics circuit, machine learning accelerator, or other co-processor 1638, via an interface 1639, which could be a PtP interface circuit. In alternative embodiments, any or all of the PtP links illustrated in FIG. 16 could be implemented as a multi-drop bus rather than a PtP link.

Chipset 1690 may be in communication with a bus 1620 via an interface circuit 1696. Bus 1620 may have one or more devices that communicate over it, such as a bus bridge 1618 and I/O devices 1616. Via a bus 1610, bus bridge 1618 may be in communication with other devices such as a user interface 1612 (such as a keyboard, mouse, touchscreen, or other input devices), communication devices 1626 (such as modems, network interface devices, or other types of communication devices that may communicate through a computer network 1660), audio I/O devices 1614, and/or a data storage device 1628. Data storage device 1628 may store code 1630, which may be executed by processors 1670 and/or 1680. In alternative embodiments, any portions of the bus architectures could be implemented with one or more PtP links.

The computer system depicted in FIG. 16 is a schematic illustration of an embodiment of a computing system that may be utilized to implement various embodiments discussed herein. It will be appreciated that various components of the system depicted in FIG. 16 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

In at least one embodiment, an apparatus comprises a memory to store 3D spatial data comprising a plurality of data points each having a coordinate of a first dimension, a coordinate of a second dimension, and a coordinate of a third dimension; and a processor comprising circuitry, the processor to divide the 3D spatial data along an axis of the second dimension into a first data segment and a second data segment, such that the first data segment is limited to data points of the 3D spatial data with second dimension coordinates within a first range and the second data segment is limited to data points of the 3D spatial data with second dimension coordinates within a second range; execute, by a first processing element, an object detection process on the first data segment to generate a first list of objects within the first data segment; execute, by a second processing element, the object detection process on the second data segment to generate a second list of objects within the second data segment; and combine a first set of objects detected in the first data segment with a second set of objects detected in the second data segment.

In an embodiment, the second dimension is a Y dimension that extends to the left and the right across a field of view represented by the 3D spatial data. In an embodiment, the second range is adjacent to and overlaps slightly with the first range. In an embodiment, both the first data segment and the second data segment include an overlapping data segment, the overlapping data segment limited to data points of the 3D spatial data with second dimension coordinates that are within both the first range and the second range. In an embodiment, the overlapping data segment is one coordinate unit wide. In an embodiment, the overlapping data segment is more than one coordinate unit wide. In an embodiment, the processor is further to identify a first object within the first data segment that includes a data point within the overlapping data segment; identify a second object within the second data segment that includes a data point in the overlapping data segment; and determine whether the first object is the same object as the second object. In an embodiment, identification of the first object within the first data segment that includes a data point in the overlapping data segment comprises determining the maximum second dimension coordinate of data points of the first object and determining that the maximum second dimension coordinate is within the overlapping data segment; and identification of the second object within the second data segment that includes a data point in the overlapping data segment comprises determining the minimum second dimension coordinate of data points of the second object and determining that the minimum second dimension coordinate is within the overlapping data segment. In an embodiment, determination of whether the first object is the same object as the second object comprises determining a first dimension coordinate and a third dimension coordinate of a data point of the first object, the data point having the maximum second dimension coordinate and determining whether the data point is within a boundary of the second object. In an embodiment, the processor is further to divide the 3D spatial data along the axis of the second dimension into a third data segment, such that the third data segment is limited to data points of the 3D spatial data with second dimension coordinates within a third range adjacent to and slightly overlapping with the second range; and combine a third set of objects detected in the third data segment with the first and second set of objects. In an embodiment, the processor is to divide the 3D spatial data along the axis of the second dimension into a fourth data segment, such that the fourth data segment is limited to data points of the 3D spatial data with second dimension coordinates within a fourth range adjacent to and slightly overlapping with the third range; combine a fourth set of objects detected in the fourth data segment with the third set of objects to generate a first combined set of objects in parallel with combining the first and second set of objects to generate a second combined set of objects; and combine the first combined set of objects with the second combined set of objects. In an embodiment, the apparatus further comprises a plurality of combination processing elements, wherein each combination processing element is to combine objects of two data segments divided along the axis of the second dimension, wherein the plurality of combination processing elements are to operate in parallel, the plurality of combination processing elements to output a unified object list comprising boundaries for objects detected within the 3D spatial data. In an embodiment, the plurality of combination processing elements are to operate in a modified inverted binary tree architecture, wherein at a stage of the modified inverted binary tree, when an odd number of data segments are to be processed, one of the data segments is passed to the next stage unprocessed. In an embodiment, the 3D spatial data includes a point cloud representing light detection and ranging (LiDAR) returns. In an embodiment, the apparatus further comprises at least one LiDAR sensor to sense the 3D spatial data.

In at least one embodiment, a method comprises dividing 3D spatial data along an axis of the second dimension into a first data segment and a second data segment, such that the first data segment is limited to data points of the 3D spatial data with second dimension coordinates within a first range and the second data segment is limited to data points of the 3D spatial data with second dimension coordinates within a second range; executing, by a first processing element, an object detection process on the first data segment to generate a first list of objects within the first data segment; executing, by a second processing element, the object detection process on the second data segment to generate a second list of objects within the second data segment; and combining a first set of objects detected in the first data segment with a second set of objects detected in the second data segment.

In an embodiment, the second dimension is a Y dimension that extends to the left and the right across a field of view represented by the 3D spatial data. In an embodiment, the second range is adjacent to and overlaps slightly with the first range.

In at least one embodiment, at least one non-transitory machine readable storage medium has instructions stored thereon, the instructions when executed by a machine to cause the machine to divide 3D spatial data along an axis of the second dimension into a first data segment and a second data segment, such that the first data segment is limited to data points of the 3D spatial data with second dimension coordinates within a first range and the second data segment is limited to data points of the 3D spatial data with second dimension coordinates within a second range; execute, by a first processing element, an object detection process on the first data segment to generate a first list of objects within the first data segment; execute, by a second processing element, the object detection process on the second data segment to generate a second list of objects within the second data segment; and combine a first set of objects detected in the first data segment with a second set of objects detected in the second data segment. In an embodiment, the second dimension is a Y dimension that extends to the left and the right across a field of view represented by the 3D spatial data.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. An apparatus comprising:
    a memory to store spatial data comprising a plurality of data points each having a coordinate of a first dimension, a coordinate of a second dimension, and a coordinate of a third dimension; and
    a processor comprising circuitry, the processor to:
        divide the spatial data along an axis of the second dimension into a first data segment and a second data segment, such that the first data segment is limited to data points of the spatial data with second dimension coordinates within a first range and the second data segment is limited to data points of the spatial data with second dimension coordinates within a second range;
        execute an object detection process on the first data segment to generate a first list of objects within the first data segment;
        execute the object detection process on the second data segment to generate a second list of objects within the second data segment; and
        generate a unified list of objects by combining at least one object of the first list of objects and at least one object of the second list of objects.

2. The apparatus of claim 1, wherein the second dimension is a Y dimension that extends to the left and the right across a field of view of an autonomous vehicle represented by the spatial data.

3. The apparatus of claim 1, wherein the second range is adjacent to and overlaps with the first range.

4. The apparatus of claim 1, wherein both the first data segment and the second data segment include an overlapping data segment, the overlapping data segment limited to data points of the spatial data with second dimension coordinates that are within both the first range and the second range.

5. The apparatus of claim 4, wherein the overlapping data segment is one coordinate unit wide.

6. The apparatus of claim 4, wherein the overlapping data segment is more than one coordinate unit wide.

7. The apparatus of claim 4, the processor further to:
    identify a first object within the first data segment that includes a data point within the overlapping data segment;
    identify a second object within the second data segment that includes a data point in the overlapping data segment; and
    determine whether the first object is the same object as the second object.

8. The apparatus of claim 7, wherein:
    identification of the first object within the first data segment that includes a data point in the overlapping data segment comprises determining a maximum second dimension coordinate of data points of the first object and determining that the maximum second dimension coordinate is within the overlapping data segment; and
    identification of the second object within the second data segment that includes a data point in the overlapping data segment comprises determining a minimum second dimension coordinate of data points of the second object and determining that the minimum second dimension coordinate is within the overlapping data segment.

9. The apparatus of claim 8, wherein determination of whether the first object is the same object as the second object comprises determining a first dimension coordinate and a third dimension coordinate of a data point of the first object, the data point having the maximum second dimension coordinate and determining whether the data point is within a boundary of the second object.

10. The apparatus of claim 8, the processor further to:
    divide the spatial data along the axis of the second dimension in a third data segment, such that the third data segment is limited to data points of the spatial data with second dimension coordinates within a third range adjacent to and slightly overlapping with the second range; and
    combine at least one object detected in the third data segment with the at least one object of the first list of objects and the at least one object of the second list of objects.

11. The apparatus of claim 10, the processor to:
    divide the spatial data along the axis of the second dimension into a fourth data segment, such that the fourth data segment is limited to data points of the spatial data with second dimension coordinates within a fourth range adjacent to and slightly overlapping with the third range;

combine at least one object detected in the fourth data segment with the at least one object detected in the third data segment to generate a first combined set of objects in parallel with combining the at least one object of the first list of objects and the at least one object of the second list of objects to generate a second combined set of objects; and combine the first combined set of objects with the second combined set of objects.

12. The apparatus of claim 1, further comprising a plurality of combination processing elements, wherein each combination processing element is to combine objects of two data segments divided along the axis of the second dimension, wherein the plurality of combination processing elements are to operate in parallel, the plurality of combination processing elements to output the unified list of objects comprising boundaries for objects detected within the spatial data.

13. The apparatus of claim 12, wherein the plurality of combination processing elements are to operate in a modified inverted binary tree architecture, wherein at a stage of the modified inverted binary tree, when an odd number of data segments are to be processed, one of the data segments is passed to the next stage unprocessed.

14. The apparatus of claim 1, wherein the spatial data includes a point cloud representing light detection and ranging (LiDAR) returns.

15. The apparatus of claim 14, further comprising at least one LiDAR sensor to obtain the spatial data.

16. A method comprising:

accessing spatial data comprising a plurality of data points each having a coordinate of a first dimension, a coordinate of a second dimension, and a coordinate of a third dimension;

dividing the spatial data along an axis of the second dimension into a first data segment and a second data segment, such that the first data segment is limited to data points of the spatial data with second dimension coordinates within a first range and the second data segment is limited to data points of the spatial data with second dimension coordinates within a second range;

executing an object detection process on the first data segment to generate a first list of objects within the first data segment;

executing the object detection process on the second data segment to generate a second list of objects within the second data segment; and generate a unified list of objects by combining at least one object of the first list of objects and at least one object of the second list of objects.

17. The method of claim 16, wherein the second dimension is a Y dimension that extends to the left and the right across a field of view represented by the spatial data.

18. The method of claim 16, wherein the second range is adjacent to and overlaps slightly with the first range.

19. At least one non-transitory machine readable storage medium having instructions stored thereon, the instructions when executed by a machine to cause the machine to:

access spatial data comprising a plurality of data points each having a coordinate of a first dimension, a coordinate of a second dimension, and a coordinate of a third dimension;

divide the spatial data along an axis of the second dimension into a first data segment and a second data segment, such that the first data segment is limited to data points of the spatial data with second dimension coordinates within a first range and the second data segment is limited to data points of the spatial data with second dimension coordinates within a second range;

execute an object detection process on the first data segment to generate a first list of objects within the first data segment;

execute the object detection process on the second data segment to generate a second list of objects within the second data segment; and generate a unified list of objects by combining at least one object of the first list of objects and at least one object of the second list of objects.

20. The at least one non-transitory machine readable storage medium of claim 19, wherein the second dimension is a Y dimension that extends to the left and the right across a field of view represented by the spatial data.

* * * * *